(12) United States Patent
Matthieu et al.

(10) Patent No.: US 10,887,397 B2
(45) Date of Patent: Jan. 5, 2021

(54) SYSTEM AND METHOD FOR CONTROLLING INTERNET OF THINGS DEVICES USING NAMESPACES

(71) Applicant: CITRIX SYSTEMS, INC., Burlington, MA (US)

(72) Inventors: Chris Matthieu, Phoenix, AZ (US); Jade Meskill, Chandler, AZ (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 409 days.

(21) Appl. No.: 15/221,907

(22) Filed: Jul. 28, 2016

(65) Prior Publication Data

US 2018/0034913 A1     Feb. 1, 2018

(51) Int. Cl.
| | |
|---|---|
| *H04L 29/08* | (2006.01) |
| *H04L 29/12* | (2006.01) |
| *H04W 8/22* | (2009.01) |
| *H04L 29/06* | (2006.01) |
| *H04W 12/06* | (2009.01) |
| *H04W 12/08* | (2009.01) |

(52) U.S. Cl.
CPC ........ *H04L 67/125* (2013.01); *H04L 61/3015* (2013.01); *H04L 63/0823* (2013.01); *H04L 63/10* (2013.01); *H04L 67/18* (2013.01); *H04L 67/24* (2013.01); *H04W 8/22* (2013.01); *H04W 12/0609* (2019.01); *H04W 12/0808* (2019.01)

(58) Field of Classification Search
CPC ... H04L 67/125; H04L 61/3015; H04L 67/18; H04L 67/24
See application file for complete search history.

(56) References Cited

U.S. PATENT DOCUMENTS

| | | | |
|---|---|---|---|
| 9,948,603 B1* | 4/2018 | Lee .................... | H04L 61/3015 |
| 2006/0080465 A1* | 4/2006 | Conzola .............. | H04L 67/1097 709/245 |
| 2009/0066534 A1* | 3/2009 | Sivakkolundhu ..... | H04L 12/281 340/4.32 |
| 2014/0241354 A1* | 8/2014 | Shuman ................. | H04L 67/16 370/390 |
| 2016/0036764 A1* | 2/2016 | Dong .................. | H04L 61/3025 370/254 |
| 2016/0073323 A1* | 3/2016 | Goto ..................... | H04W 8/005 370/338 |
| 2016/0173495 A1* | 6/2016 | Joo ........................ | H04L 63/08 713/171 |
| 2016/0182446 A1 | 6/2016 | Kong et al. | |
| 2016/0205078 A1 | 7/2016 | James et al. | |
| 2016/0205097 A1 | 7/2016 | Yacoub et al. | |
| 2016/0366123 A1* | 12/2016 | Smith ................. | H04L 61/1511 |

* cited by examiner

*Primary Examiner* — Chris Parry
*Assistant Examiner* — Steven C Nguyen
(74) *Attorney, Agent, or Firm* — Allen, Dyer, Doppelt + Gilchrist, PA

(57) ABSTRACT

A system includes a server to assign a namespace to Internet of Things (IoT) devices, with the IoT devices being at different locations, and with each IoT device having a universal unique identifier (UUID) associated therewith. The server assigns at least one sub-namespace to each IoT device based on its location, and maps the UUID associated with each IoT device to both the namespace and the at least one sub-namespace assigned thereto. A device cooperates with the server to generate commands for controlling the IoT devices based on the namespaces and the at least one sub-namespaces mapped to the respective UUIDs.

24 Claims, 12 Drawing Sheets

600

RECEIVE A COMMUNICATION FROM A FIRST IoT DEVICE, WHEREIN THE COMMUNICATION IS DESTINED FOR A SECOND IoT DEVICE, WHEREIN THE FIRST IoT DEVICE IS ASSIGNED A FIRST UNIVERSALLY UNIQUE IDENTIFIER, AND WHEREIN THE COMMUNICATION INCLUDES A SECOND UNIVERSALLY UNIQUE IDENTIFER ASSIGNED TO THE SECOND IoT DEVICE.
602

↓

OBTAIN THE SECOND UNIVERSALLY UNIQUE IDENTIFIER
604

↓

DETERMINE THAT THE SECOND UNIVERSALLY UNIQUE IDENTIFIER IS ASSIGNED TO THE SECOND IoT DEVICE
606

↓

DETERMINE, USING THE SECOND UNIVERSALLY UNIQUE IDENTIFIER, THAT THE COMMUNICATION RECEIVED FROM THE FIRST IoT DEVICE IS AN UNAUTHORIZED MESSAGE ATTEMPT BY THE FIRST IoT DEVICE TO EXCHANGE A MESSAGE WITH THE SECOND IoT DEVICE.
608

*FIG. 6*

SYSTEM AND METHOD FOR CONTROLLING INTERNET OF THINGS DEVICES USING NAMESPACES

FIELD OF THE INVENTION

The present invention relates to Internet of Things (IoT) devices, and more particularly, to a system and method for controlling IoT devices using namespaces assigned to the IoT devices.

BACKGROUND OF THE INVENTION

Internet of Things (IoT) devices allow objects and even people to be provided with universally unique identifiers (UUIDs), and these IoT devices have the ability to transfer data over a network without requiring human-to-human or human-to-computer interaction. IoT devices have evolved from the convergence of wireless technologies, micro-electromechanical systems (MEMS) and the Internet.

As an example, IoT devices include various information sensing devices, such as sensors, RFID devices, GPS systems, infrared sensors, laser scanners, gas transducers, etc. IoT devices are based on the idea that each device, not just computers and computer networks, can be readable, recognizable, locatable, addressable, and controllable via an IoT platform (e.g., an ad-hoc system or the Internet). An objective of IoT devices is to realize connections between other IoT devices, persons, and networks for identifying, managing and controlling the IoT devices from a remote location.

There currently are an estimated 15 billion connected IoT devices, and there will be an estimated 200 billion by 2020. In the near future, the number of connected IoT devices will surpass PCs, laptops, and mobile devices.

There are various IoT platforms for connecting and controlling IoT devices. For example, Octoblu's IoT services are built on an open source platform referred to as meshblu. Meshblu is an open communications and management platform that supports a variety of protocols for physical devices to communicate seamlessly with each other, people, and web services. Through public, private, or hybrid clouds users can connect, design, process, and analyze the flow of information.

A problem with IoT devices is that IoT device names and message routes are difficult to remember. For example, Octoblu's IoT device names and message routes are implemented as 36 character UUIDs (e.g., 85d18f38-2cb4-41d7-a58f-339048ce17a6). Octoblu UUIDs can be associated with or related to or grouped by other UUIDs. For example, a user may have a UUID, the user's home has a UUID, the user's car has a UUID, the lights in the user's house each have a UUID, and the garage door in the user's house also has a UUID. The UUIDs for all of these IoT devices are too long to remember, and there is no easy way to identify a group of IoT devices belonging to a particular user.

One approach for controlling IoT devices is disclosed in U.S. patent application no. 2016/0205078 which is based on registering an IoT device with a DNS registry. Obtained from a DNS server is an identifier, an IP address, and a public key of an asymmetric key pair associated with the IoT device from a network gateway device that is in communication with the IoT device. The asymmetric key pair is provisioned onto the IoT device and an associated private key stored within a memory of the IoT device at a time that the IoT device is manufactured, or during a predetermined time window after manufacturing. A DNS record for the IoT device is created. A domain name associated with the internet protocol (IP) address is assigned to the IoT device. The identifier, the IP address, the domain name, and the public key are stored in the DNS record.

Even in view of the above approach for controlling IoT devices, there is still a need to provide a more convenient way to control and group together IoT devices.

SUMMARY OF THE INVENTION

A system includes a server configured to assign a namespace to a plurality of Internet of Things (IoT) devices, with the plurality of IoT devices being at different locations, and with each IoT device having a universal unique identifier (UUID) associated therewith. The server may assign at least one sub-namespace to each IoT device based on its location, and map the UUID associated with each IoT device to both the namespace and the at least one sub-namespace assigned thereto. A device may cooperate with the server to generate commands for controlling the IoT devices based on the namespaces and the at least one sub-namespaces mapped to the respective UUIDs.

The namespace and the sub-namespaces may be easy-to-remember names that advantageously allows a user to recognizably identify and even group together the IoT devices by location and by function. When commands are generated to control the IoT devices, the commands advantageously do not include the UUIDs associated with the IoT devices. Instead, the namespace and the sub-namespaces may be translated to the UUIDs and routing paths stored in an IoT device registry needed to communicate via an IoT platform.

A portion of the IoT devices may be grouped together based on performing a same function, and the commands may include a wildcard command to simultaneously control each IoT device within the grouped together IoT devices.

In addition, the commands may include a shared command to control multiple IoT devices performing a same function at the different locations. The device may comprise a mobile device or an IoT device configured to provide its location or proximity to other IoT devices to the server when generating the shared command, and the server may then select one of the multiple IoT devices to control based on location of where the command initiated.

The server may be further configured to associate the IoT devices to at least one IoT platform operating based on at least one IoT protocol. A first portion of the IoT devices may be associated with a first IoT platform operating based on a first IoT protocol, and a second portion of the IoT devices may be associated with a second IoT platform operating based on a second IoT protocol that is different from the first IoT protocol. The first and second IoT platforms may operate at a same time.

The server may be further configured to generate at least one restrictions record associated with the IoT devices, with the at least one restrictions record allowing the server to control access to the IoT devices based on at least one of timing restrictions, location restrictions, presence restrictions and path restrictions.

The server may be further configured to generate at least one permissions record associated with the IoT devices, with the at least one permissions record allowing the server to detect unauthorized commands for controlling the IoT devices. The at least one permissions record may include a whitelist identifying which IoT devices can communicate with other IoT devices, and a blacklist identifying which IoT devices cannot communicate with other IoT devices.

In addition, the server may be further configured to associate a first portion of the IoT devices to a first IoT platform operating based on a first IoT protocol, and a second portion of the IoT devices to a second IoT platform operating based on a second IoT protocol different from the first IoT protocol. The at least one permissions record may include a first permissions record associated with the first IoT platform and a second permissions record associated with the second IoT platform.

The namespace may be in a leftmost position, and for each respective IoT device, is followed by the at least one sub-namespace assigned to that respective IoT device. The server may be configured as a cloud-based server. The device may control the IoT devices via a wireless network.

Another aspect is directed to a method for operating a system based on the above discussed namespaces and sub-namespaces to control IoT devices. The method may comprise operating the server to assign a namespace to IoT devices, with the IoT devices being at different locations, and with each IoT device having a UUID associated therewith. At least one sub-namespace may be assigned to each IoT device based on its location. The UUID associated with each IoT device may be mapped to both the namespace and the at least one sub-namespace assigned thereto. The method may further include operating the device to generate commands for controlling the IoT devices based on the namespaces and the at least one sub-namespaces mapped to the respective UUIDs.

Yet another aspect is directed to a non-transitory computer readable medium having a plurality of computer executable instructions for causing a system to perform steps that include assigning a namespace to a IoT devices, with the IoT devices being at different locations, and with each IoT device having a UUID associated therewith. The steps further include assigning at least one sub-namespace to each IoT device based on its location, and mapping the UUID associated with each IoT device to both the namespace and the at least one sub-namespace assigned thereto. The IoT devices are then controlled based on the step of receiving commands that have the namespaces and the at least one sub-namespaces mapped to the respective UUIDs.

BRIEF DESCRIPTION OF THE DRAWINGS

FIG. 6 is a flowchart illustrating an embodiment of a process of detecting an unauthorized message attempt, according to some embodiments.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
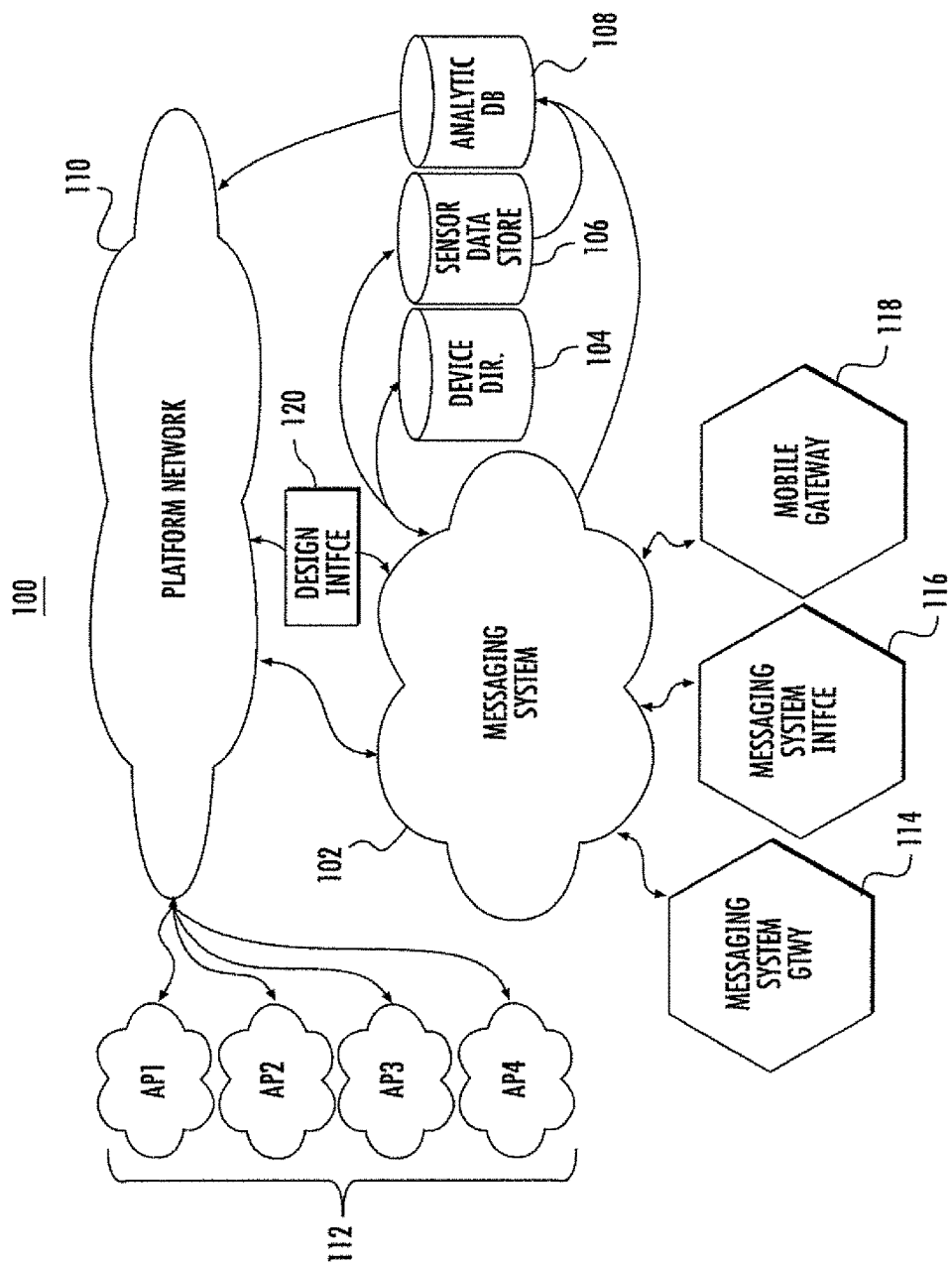
FIG. 1 is a system diagram illustrating an example of a system for connecting devices, such as Internet of Things (IoT) devices, other devices or machines, and systems, according to some embodiments.

FIG. 1 depicts a system 100 for connecting devices, such as IoT devices, other devices or machines, and/or systems. An IoT device may include any network-connectable device or system having sensing or control functionality. An IoT device may be connectable to a local area network (LAN), a personal area network (PAN), and to a wide area network (WAN). For example, an IoT device may include one or more radios operating using one or more communications protocols that allow the IoT device to connect to one or more LANs or PANs, such as WiFi™, ZigBee™, Bluetooth™, Bluetooth low Energy™ (BLE), Infrared Data Association, Transmission Control Protocol (TCP), User Datagram Protocol (UDP), and any other suitable protocol that allows connection to a LAN.

A LAN may interconnect various network devices and provide the network devices with the ability to connect to a WAN. A router, modem, access point, or other switching mechanism may be used to control and manage the connections to the network devices. A PAN may provide network access for a user's personal devices (e.g., a network for connecting devices worn or carried by the user, for connecting devices located in the user's workspace, or the like), and may further provide access to other networks, such as a LAN or a WAN.

The IoT device may further include one or more radios that allow the IoT device to connect to a WAN, such as the Internet, a private cloud network, a public cloud network, or any other network external to a local network. In some embodiments, an IoT device may not include a cellular radio, and may only be connectable to a LAN, PAN, or WAN other than a cellular network. In some embodiments, in IoT device may include a cellular radio. The system 100 may also include third-party messaging services (e.g., Facebook, twitter, LinkedIn, SMS, etc.) as well as non-IoT devices and systems.

The system 100 may include one or more remote servers, or clouds, that are in communication with other devices or systems via a network, such as the Internet, an intranet, a LAN, a PAN, or a WAN. For example, the system 100 includes a common messaging system 102 (or messaging system 102) that supports machine-to-machine instant message exchange in real-time or near real-time. In some embodiments, the messaging system 102 may be an open source machine-to-machine messaging platform, enabling IoT devices, other devices or machines, and/or systems to exchange messages or otherwise communicate with any other IoT devices, other devices or machines, and/or systems.

The messaging system 102 may be implemented by one or more remote servers and may allow an IoT device, other device or machine, and/or a system to exchange communications or messages with another device or system regardless of whether the devices or systems are built by different manufacturers, operate using different connection protocols or interfaces, or whether the devices or systems are built with the ability to communicate with a network. While only a single messaging system 102 is shown in FIG. 1, one of ordinary skill in the art will appreciate that multiple private or public messaging systems may be implemented using the techniques described herein.

One or more remote servers of the messaging system 102 may be connected to a network via the Internet and/or other connection platforms (e.g., a WAN and/or a LAN) such that the servers may be accessed from anywhere in the world. The remote servers allow IoT devices, other devices or machines, and/or systems connected to the servers via the network to communicate and exchange messages with other IoT devices, other devices or machines, and/or systems from anywhere in the world. The remote servers may be configured with enough processing power to run an application, store and process data, and/or perform any other computing task, in some examples, the remote servers may provide enough processing power to operate applications running on devices located remotely from the servers and applications running on the servers themselves.

Messaging system 102 may be configured to support multiple connection protocols, such as any suitable machine-to-machine connection protocol. For example, the messaging system 102 may support connection protocols such as hypertext transfer protocol (HTTP), websockets, message queuing telemetry transport (MQTT), constrained application protocol (CoAP), Extensible Messaging and Presence Protocol (XMPP), Simple Network Management Protocol (SNMP), AliJoyn, and/or any other suitable connection protocol. The multiple connection protocols supported by the messaging system 102 may be referred to herein as native connection protocols of the messaging system 102. Messaging system 102 may also support multiple developer platforms, such as one or more software developer kits (SDKs). For example, the messaging system may support SDKs such as Node.JS, JavaScript, Python, Ruby, or any other suitable SDK. The support of multiple developer platforms and protocols provides programmers with the flexibility to customize functions, instructions, and commands for IoT devices, other devices or machines, and/or systems connected to messaging system 102.

The messaging system 102 may include a cloud infrastructure system that provides cloud services. In certain embodiments, services provided by the cloud infrastructure of messaging system 102 may include a host of services that are made available to users of the cloud infrastructure system on demand, such as registration, access control, and message routing for users, devices or machines, systems, or components thereof. Services provided by the messaging system 102 can be dynamically scaled to meet the demands of users.

The messaging system 102 may comprise one or more computers, servers, and/or systems. In some embodiments, the computers, servers, and/or systems that make up the cloud network of the messaging system 102 are different from a user's own on-premises computers, servers, and/or systems. For example, the cloud network may host an application, and a user may, via a communication network such as a WAN, LAN, and/or PAN, on demand, order and use the application.

In some embodiments, the cloud network of the messaging system 102 may host a Network Address Translation Traversal application to establish a secure connection between the messaging system 102 and a device or machine. A separate secure connection (e.g., using a native protocol of the messaging system 102) may be established by each device or machine for communicating with the messaging system 102. In certain embodiments, the cloud network of the messaging system 102 may include a suite of applications, middleware, or firmware that can be accessed by a user, device or machine, system, or component thereof.

Upon registering with the messaging system 102, each device or machine, person, and/or system may be assigned a unique identifier and a security token. For example, a device (IoT or other device) or system connected to the messaging system, a person associated with an account or an application that utilizes the messaging system, or the like may be assigned or otherwise provided with a distinct universally unique identifier (UUID) and/or a distinct security token.

Each IoT device, other device or machine, system, and/or person using a device must communicate its distinct UUID and security token to the messaging system 102 in order to access the messaging system 102. The messaging system 102 may authenticate the device, other device or machine, system, and/or person using each respective distinct UUID and token. The messaging system 102 may use the UUIDs to process, route, and/or otherwise manage messages and other communications to an appropriate device, person, system, and/or machine. For example, a device may send a message with its UUID and a destination UUID for the device, system, or person to which the message is destined. The messaging system 102 may process, route, and/or otherwise manage the message so that it is received at the appropriate destination.

In some embodiments, one or more components or programs of a device or system may also be assigned a unique identifier and a security token. In some cases, the unique identifier and/or token for the components of a device or system may be the same as the unique identifier and/or token of the device or system itself. In some cases, the unique identifier and/or token for a component or program of a device or system may be different from that of the device or system and may be unique only to the component or program.

In some embodiments, components of a device or system that may be assigned a unique identifier may include a sensor (e.g., a camera, motion sensor, temperature sensor, accelerometer, gyroscope, or any other available sensor), an output (e.g., a microphone, siren, display, light, tactile output, or any other available output), a third-party messaging service that the device or system is able to run, or any other component of a device or system that can be identified, accessed, and/or controlled.

Messaging system 102 may further be configured to interact with any application programming interface (API). Each API may also be assigned or otherwise provided with a unique identifier (e.g., a distinct UUID) and/or a security token. Assigning APIs with a unique identifier enables messaging system 102 to receive instructions from and provide instructions to any IoT device, other device or machine, and/or system that is connected to the messaging system 102. By being able to interact with any API, messaging system 102 may control the functionality of all components of a registered IoT device, other device or machine, and/or system that are accessible by the messaging system 102. In some embodiments, messaging system 102 may be configured such that a single message transmitted by messaging system 102 may be communicated to multiple devices and/or systems having different APIs.

Accessible IoT devices, other devices or machines, and/or systems include any device that has been registered with messaging system 102 and that has been assigned a unique identifier and/or a security token. For example, a user may purchase an IoT device. The user must register the IoT device with the messaging system 102, and may be assigned a UUID and security token by the messaging system 102 to make the IoT device accessible to the messaging system 102 and other devices registered with the messaging system 102.

Using the common messaging system 102, people, devices, systems, and/or components thereof that have assigned UUIDs can query and communicate with a network of other people, devices, system, and components thereof that have assigned UUIDs and that meet specific search criteria. For example, a device may query the common messaging system 102 searching for a specific type of device or devices that are located in a particular area, and may receive a list of UUIDs for devices that meet the search criteria. The device may then send a message with a destination UUID assigned to the destination device to which the device wants to send a message.

In some embodiments, messaging system 102 may also detect, connect, and/or communicate with other servers, allowing messaging system 102 to route messages to IoT devices, other devices or machines, and/or systems on the other servers via a server-to-server connection. Server-to-server communications may include connections used to transfer data from one server to another server. For example, a user may use multiple cloud servers to store different types of information. A user may want to transfer data from a first server of a first cloud network to a second server of a second cloud network. A server-to-server communication allows the user to directly transfer or otherwise share this information with the second server.

As another example, the messaging system 102 supports inter-cloud communications to allow people, devices or machines, systems, or components thereof to route messages across clouds to other people, devices or machines, systems, or components thereof registered with other clouds. For instance, a device connected to a private or public cloud network may send a message to another device connected to another private or public cloud.

IoT devices, other devices or machines, and/or systems may be able to connect with the messaging system 102 in several ways. In some embodiments, devices and systems may communicate with the messaging system 102 using a messaging system gateway or hub. For example, IoT devices, other devices or machines, and/or systems may communicate with the messaging system 102 using messaging system gateway 114. The messaging system gateway 114 may be connected to a same LAN as the devices that use the messaging system gateway 114. For example, the messaging system gateway 114 may be installed at a location, such as a home, office, a sports venue, an outside environment (e.g., a park, a city, or the like), or any other suitable location.

In some embodiments, the messaging system gateway 114 includes an instance of messaging system software that is configured to interact with the messaging system 102. In some cases, the messaging system gateway 114 may be run on an operating system, such as, but not limited to, Linux™, Mac™ OS, and/or In some embodiments, a messaging system gateway 114 may be a standalone physical device, such as a wireless router or modem, which runs the gateway software that connects to the messaging system 102 using a WAN. In some embodiments, a messaging system gateway 114 may be integrated into an IoT device, other device or machine, and/or system by installing the gateway software onto the IoT device, other device or machine, and/or system. For example, the messaging system gateway 114 may be run on computing devices such as a Raspberry Pi, a home and/or office computer, Intel™ Galileo, Beagle Bones, Yuns, and/or other suitable computing device.

Regardless of physical form, the messaging system gateway 114 may operate as an intermediary between the messaging system 102 and the devices or systems that use the messaging system gateway 114. For example, IoT devices, other devices or machines, and/or systems may be connected to messaging system gateway 114, which then links the IoT devices, other devices or machines, and/or systems to the messaging system 102 in real-time.

The connection of a device or system to the messaging system 102 via the messaging system gateway 114 allows connected IoT devices, other devices or machines, and/or systems to communicate with one another in real-time. IoT devices, other devices or machines, and/or systems may be connected to messaging system gateway 114 using one or more native connection protocols of the IoT device, other device or machine, and/or system.

The protocols may include, but are not limited to, Transmission Control Protocol (TCP), User Datagram Protocol (UDP), WiFi, ZigBee, Bluetooth low energy (BLE), HTTP, websockets, MQTT, CoAP, XMPP, SNMP, AllJoyn, and/or any other suitable connection protocol. In some embodiments, messaging system gateway 114 may broadcast a private network signal such that registered devices and systems may securely connect to the messaging system gateway 114 and to the messaging system 102. Devices and systems that do not have access to the messaging system gateway 114 and messaging system 102 may be unable to process the private network signal.

In some embodiments, messaging system gateway 114 is on a LAN side of a firewall, such as a network address translations (NAT) firewall implemented using a router, or other suitable firewall. In some cases, the messaging system gateway 114 may use websockets to connect to the messaging system 102. The connection between websockets of the messaging system gateway 114 and the messaging system 102 may include a bi-directional persistent connection. The bi-directional persistent connection may auto-reconnect as WAN (e.g., Internet, or the like) connectivity becomes available.

By locating the messaging system gateway 114 inside of the firewall, only communications to and from the messaging system gateway 114 have to be granted access to the firewall. Accordingly, the messaging system 102 and any system and/or device connected to the messaging system gateway 114 may communicate through the firewall via the messaging system gateway 114. The messaging system gateway 114 may be used by a person or business to connect various IoT devices, other devices or machines, and/or systems to the messaging system 102, serving as a secure connection for communicating with messaging system 102, much like a personal firewall.

Devices and systems may also be able to communicate with the messaging system 102 using a mobile messaging system gateway that is installed on a mobile device. For example, IoT devices, other devices or machines, and/or systems may be able to connect with the messaging system 102 using a mobile gateway 118. The mobile gateway 118 may be similar to a messaging system gateway 114, but instead is installed and operated on a mobile device. For example, mobile gateway 118 may be installed on a mobile phone, tablet, laptop, wearable device, or other suitable mobile device.

The mobile gateway 118 may allow the mobile phone to connect to the messaging system 102. The mobile gateway 118 may access all sensors on the mobile device. For example, geolocation sensor data, compass headings, accelerometer data, or any other sensor data of a mobile phone may be provided to the messaging system 102 through mobile gateway 118. In some embodiments, the mobile gateway 118 may be installed in wearable technology, such as pedometers, headsets, watches, and the like, as well as in Bluetooth™ low-energy devices.

In some embodiments, the mobile gateway 118 may also provide a personal area network (PAN) and may allow other devices that are connectable to the mobile device to connect to the messaging system 102 via the mobile gateway 118. For example, one or more devices that do not have an Internet Protocol address and that are not able to connect to a LAN (e.g., a WiFi network or the like) may connect to the mobile gateway 118 using a wired interface or a short-range communication protocol interface, such as Bluetooth, BLE, Zigbee, near field communication (NFC), radio frequency (RF), infrared (IR), or any other suitable communication protocol.

These devices may then connect to messaging system 102 through the mobile gateway 118 of the mobile device. The mobile gateway 118 may operate to exchange communications between the devices and the messaging system 102. Devices that do not have an Internet Protocol address and that are not able to connect to a local area network may include wearable technology or other similar devices that only have access to a PAN.

In some embodiments, an IoT device, other device or machine, and/or system may connect with messaging system 102, the messaging system gateway 114, and/or the mobile gateway 118 using a universal messaging system interface 116 that is programmed into the device or system. The built-in universal messaging system interface 116 (or universal interface 116) allows a device or system to perform operations that native firmware of the device or system does not allow it to perform. For example, the messaging system interface 116 may override the native firmware of a device to allow the device to perform various operations that are outside of the functionality of the native firmware.

In some embodiments, the messaging system interface 116 may be installed on a device that does not have the ability to communicate with other devices using one or more connection protocols. In such embodiments, the messaging system interface 116 may provide the device with the capability to use one or more connection protocols. The messaging system interface 116 may access one or more sensors, inputs, outputs, or programs on the device or system in order to perform various operations. For example, the messaging system interface 116 may have access to and control a geolocation sensor, a compass, a camera, a motion sensor, a temperature sensor, an accelerometer, a gyroscope, a graphical interface input, a keypad input, a touchscreen input, a microphone, a siren, a display, a light, a tactile output, a third-party messaging service that the device or system is able to run, or any other component of a device or system that can be identified, accessed, and/or controlled.

In some embodiments, the built-in universal messaging system interface 116 may include an operating system that allows the device to communicate with the messaging system 102. Messaging system interface 116 may be installed on an IoT device, other device or machine, and/or system server. For example, the messaging system interface 16 may be installed on a Raspberry Pi board, an Arduino board, a microcontroller, a minicomputer, or any other suitable computing device.

In some embodiments, a device or system running the messaging system interface 116 may connect directly to messaging system 102. In some embodiments, a device or system running the messaging system interface 116 may connect to the messaging system 102 via the messaging system gateway 114 or the mobile gateway 118. The messaging system interface 116 run by the device or system may be assigned a UUID and a token. The messaging system interface 116 may connect to the messaging system 102 using the assigned UUID and token, and may await further instructions from the messaging system 102.

In some embodiments, the messaging system 102 may act as a compute server that controls the messaging system interface 116. For example, messaging system 102 may activate and/or deactivate pins of the computing device running the messaging system interface 116, request sensor data from the computing device, and/or cause the messaging system interface 116 to perform other functions related to the computing device. In some embodiments, the messaging system interface 116 can be connected to a gateway (e.g., messaging system gateway 114 or mobile gateway 118), and the gateway may act as a compute server that controls the messaging system interface 116 in a similar manner as described above. In some embodiments, messaging system interface 116 may be a mobile operating system or application that is able to run on mobile device operating systems, such as iOS and Android™ operating systems.

Information obtained by messaging system 102, including information transmitted to messaging system 102 by messaging system gateway 114, mobile gateway 118, messaging system interface 116 and/or directly from an IoT device or system, may be transmitted to one or more data storage systems. For example, information about IoT devices, other devices or machines, and/or systems registered with the messaging system 102 may be transmitted to device directory 104 for storage.

In some embodiments, the information about the IoT device, other device or machine, and/or system may be stored in device directory 104 upon registration of the IoT device, other device or machine, and/or system. For example, information stored in device directory 104 for a device or system may include a unique identifier (e.g., a UUID), a token, information related to when the device or system comes online or offline, a permissions record (described below), a security profile (described below), and/or any other relevant information.

In some embodiments, the device directory 104 is queriable, such that a device, system, or user may be provided with a list and/or array of IoT devices, other devices or machines, and/or systems that fit requested search criteria. The messaging system 102 may access the device directory 104 upon receiving a query from a device, system, or user. Upon polling the device directory 104 according to the criteria specified in a query made by a device, the messaging system 102 may provide the device with a list or array of unique identifiers (e.g., UUIDs) assigned to IoT devices, other devices or machines, and/or systems that are currently online and that the device has access to according to the device's UUID and/or security token.

As described in further detail below, the device's access may be determined using permission records and/or security profiles of the IoT devices, other devices or machines, and/or systems that meet the search criteria of the query. For example, a permissions record operates as a security feature, ensuring that devices, systems, and users only have access to other devices, systems, and users to which permission has been granted.

In some embodiments, sensor data from sensors of registered IoT devices, other devices or machines, and/or systems may be transmitted to sensor data storage 106. The sensor data may be streamed from a registered IoT device, other device or machine, and/or system through messaging system 102 in real-time. Sensor data storage 106 is queriable such that a user, device, or system may poll sensor data storage 106 to receive data from specified sensors during a specified time period.

A user, device, or system may also be able to query the sensor data storage 106 for all available data from one or more sensors. In some embodiments, information from sensor data storage 106, as well as additional information from messaging system 102, may be transmitted to an analytics database 108. In some embodiments, analytics database 108 may not be queried by a user of the system 100. In other embodiments, analytics database 106 may be queried by a user of the system 100. The information stored in analytics database 108 may be accessible via a platform network 110.

In some embodiments, multiple servers or other systems may each operate an instance of software that includes the messaging system 102, thus creating multiple cloud servers and/or instances of messaging systems 102. In some embodiments, a particular instance of messaging system 102 may have its own UUID that allows the instance of messaging system 102 to connect to another instance of messaging system 102 to form a mesh network of messaging systems. Other networks and devices or machines may also be part of the mesh network, such as LANs and PANs and the devices or machines that are interconnected using the LANs and PANs.

Each of the LANs and PANs can have their own unique UUID and/or token registered with the messaging system 102. The LANs and PANs are addressable using their unique UUID, and can also address other UUIDs around the world. Such a mesh network may allow messages and other communications to be routed between devices across messaging systems 102. Accordingly, the messaging system 102 supports inter-cloud communications to allow people, devices or machines, systems, or components thereof to route messages across clouds to other people, devices or machines, systems, or components thereof on other clouds. Each of the cloud networks may run an instance of the messaging system 102. For instance, a device connected to a private or public cloud network may send a message to another device connected to another private or public cloud.

As described above, each person, device or machine, system (e.g., cloud network running an instance of the messaging system, a LAN, a PAN, or the like), or components thereof, that is registered with the messaging system 102 is assigned a UUID. Each person, device or machine, system, or components thereof can be referenced by the messaging system using its UUID. Each of the UUIDs can discover other UUIDs (e.g., clouds, other networks, people, or devices or machines) using one or more queries, such as using multicast Domain Name System (MDNS) or API queries.

In some embodiments, a UUID can connect to multiple networks thus forming a global mesh network including different networks (e.g., multiple cloud networks, LANs, PANS, or a combination of cloud networks, LANs, and/or PANs). A cloud network running an instance of messaging system may also be assigned a UUID and can route messages across cloud networks via inter-cloud communications using a routing paradigm. For example, a cloud network can send a message across cloud networks by sending the message with a route UUID_1/UUID_2/UUID_3/UUID_4, with each UUID being assigned to a different cloud network. In some embodiments, the mesh network may route the message based on known connections.

Platform network 110 may include one or more analytics engines that may process the information received from the analytics database 108. The analytics engines may aggregate the received information, detect trends, and/or perform other analytics on the information. Platform network 110 may be communicatively coupled with a number of APIs 112 that are used to create, manage, identify, and/or communicate with functions of different IoT devices, other devices or machines, and/or systems.

APIs may include, for example, sales analytics APIs, social media account and other third-party messaging account APIs, stock quote APIs, weather service APIs, other data APIs, mobile application APIs, and any other suitable API. For example, a Facebook™ or other social media message may use a messaging API to send SMS messages. Platform network 110 may use the messaging API to deliver a message to a device or system configured to display a SMS message.

A light API may be provided by a manufacturer of "smart" light bulbs. The platform network 110 may utilize the light API to provide an output to turn a light bulb connected to the platform network 110 on or off. Platform network 110 is also in communication with messaging system 102 using the APIs of messaging system 102. Platform network 110 may interact with the IoT devices, other devices or machines, and/or systems connected through the messaging system 102 using UUIDs and/or security tokens.

The UUIDs and/or security tokens may be issued by the messaging system 102 and/or the platform network 110. In some embodiments, a user may register systems and/or devices with the messaging system 102. The platform network 110 may import or otherwise utilize any UUIDs and/or tokens issued by the messaging system 102 during the registration. In some embodiments, a user may register devices and/or systems with the platform network 110.

The platform network 110 may issue UUIDs and security tokens to IoT devices, other devices or machines, and/or systems upon registration of the IoT device, other device or machine, and/or system. The UUIDs and security tokens are used to access the messaging system 102, as described above. In some embodiments, a user may register devices and/or systems with both the messaging system 102 and the platform network 110. Either messaging system 102 or platform network 110 may issue UUIDs and/or tokens. Registration with the non-issuing system or network creates a link or other association with the issued UUIDs and/or security tokens.

Platform network 110 may operate an application or other program that provides a designer graphical interface that allows a user to create a control system or flow. The designer graphical interface may allow the user to create a control system by dragging and dropping blocks that represent various devices and/or systems of the control system, blocks that represent inputs and/or outputs from the various devices and/or systems, and/or blocks that represent functions for controlling the devices and/or systems.

Any IoT device, other device or machine, and/or system that is registered with platform network 110 may be configured to receive or transmit a message to any other IoT device, other device or machine, and/or system that is registered with platform network 110 using an appropriate control system designed using the designer graphical interface. Messages may be transmitted from one device or system to control operation of another device or system. For example, the platform network 110 may run control systems continuously, such that an input from a device or system may automatically cause an event to occur in a different location and/or by a different device or system. Such functionality, along with access to the data from analytics database 108, enables the platform network 110 to monitor a performance, behavior, and/or state of any IoT device, other device or machine, and/or system within the control system, and to send a resulting message or communication to any other IoT device, other device or machine, and/or system in the control system based on the monitored performance, behavior, and/or state. In another example, the platform network 110 may run a control system designed using the designer graphical interface upon receiving a command, such as from a user or from another device or system.

In some embodiments, the designer graphical interface operated by the platform network 110 may access any IoT device, other device or machine, and/or system connected to messaging system 102, including IoT devices, other devices or machines, and/or systems connected using the messaging system gateway 114, messaging system interface 116, and/or mobile gateway 118. This connection enables control systems created using the designer graphical interface to control output functions of devices and/or systems registered with the messaging system 102. For example, real-time monitoring of data at a remote location, such as performance of a machine or system, or of a person's health condition may be performed by the platform network 110.

The platform network 110 may also automatically provide messages or other outputs, including commands, to any of the registered IoT devices, other devices or machines, and/or systems based on processes performed on information received from IoT devices, other device or machine, and/or system. For example, sensor data may be received from an IoT device and processed by analytics systems of the platform network 110. Using artificial intelligence and/or machine learning within the platform network 110, the processed sensor data may be used to provide commands to another system or device connected to platform network 110.

Figure 2:
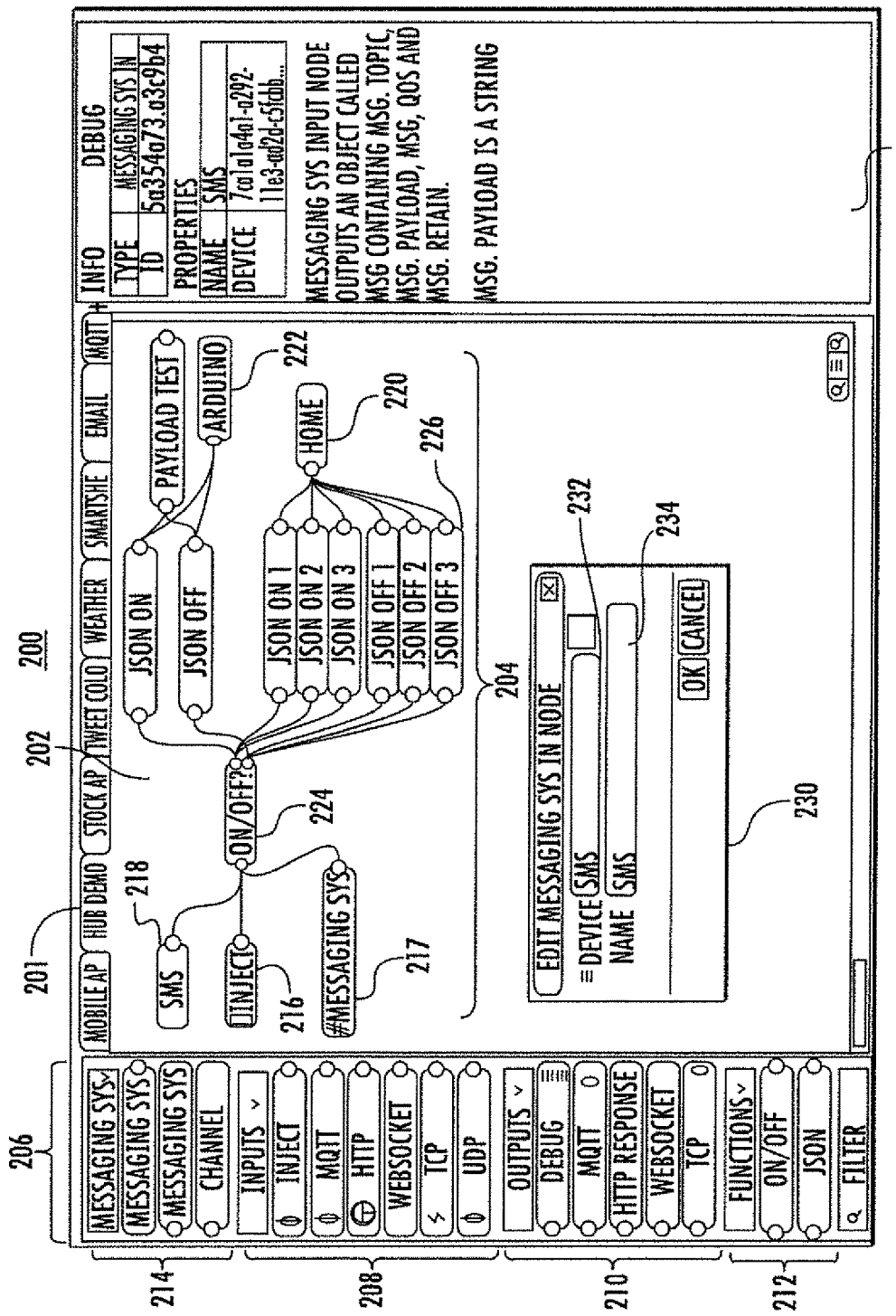
FIG. 2 illustrates an example of a designer interface for designing a control system for IoT devices, other devices or machines, and systems, according to some embodiments.

FIG. 2 illustrates an example of a designer tool 200 provided by the platform network 110 that may be used to design a control system or flow. The designer tool 200 may include a graphical interface 202 on which input blocks, output blocks, and/or function blocks may be dragged and/or dropped to design the control system 204. In some embodiments, tool 200 may include one or more tabs 201 that allow a user to design different control systems 204 on different tabs 201. A user may create and/or delete tabs 201 to maintain a desired number of control systems 204. Tool 200 may include a sidebar or palette 206 that includes a number of input blocks 208, output blocks 210, and function blocks 212. Some blocks 214 on palette 206 may represent IoT devices. In some embodiments, at least one input block or at least one output block of the tool 200 represents an IoT device. In some embodiments, multiple IoT devices are included, each IoT device being represented by a different block. It will be appreciated that any number of combinations of input blocks 208, output blocks 210, and/or function blocks 212 may be combined to form control systems that perform any number of functions.

The control system 204 designed using tool 200 may include one or more input blocks 216 and 218, each input block 216 and 218 representing an IoT device (or a component thereof), a third-party messaging account, a system, or a computing device (or a component thereof). Each of the IoT devices, third-party messaging accounts, systems, and computing devices represented by blocks of the tool 200 may be identified using a distinct UUID that is provided when the IoT device, third-party messaging accounts, system, and/or computing device is registered for use with the tool 200, such as by registering with a messaging system and/or platform network as described in FIG. 1. Each IoT device, third-party messaging accounts, system, and/or computing device registered for use with the tool 200 may communicate with the tool 200 using a messaging system gateway, interfacing with a computing device running an instance of the messaging system interface, and/or using a mobile gateway as described in FIG. 1.

Input block 216 allows a message to be injected into the control system 204. In some embodiments, input block 216 is used during testing of the control system 204, as the message originates in input block 216 rather than being received from an IoT device, third-party messaging account, or other computing device. Input blocks may also represent an IoT device, third-party messaging account, a system, or a computing device. Examples of third-party messaging accounts include a phone number, a social media account, or any other suitable account from which a user can send a message.

Input blocks pass a message or other communication from the IoT device, third-party messaging account, or computing device into the control system 204. For example, input block 217 represents a third-party messaging account known as a Twitter™ account. The Twitter™ account may be identified using a user's username or handle, which may be associated with a UUID. Input block 217 may pass a Twitter™ message, or "Tweet," from the third-party messaging account to the control system 204. The content of the Tweet can be used by a function block to drive an output of the control system 204 that is provided to a device represented by an output block.

As another example, input block 218 represents a third-party messaging account, such as a telephone number, that passes an SMS message to the control system 204. The third-party messaging account associated with input block 218 is identified using its UUID. The UUID may correspond to a phone number or other identifier associated with the third-party messaging account, or the UUID may be a random identifier assigned by a messaging system and/or platform network. The SMS message may include a hashtag alerting the control system 204 to perform a specified function. A hashtag or keyword may be included in the SMS or other message that alerts the input block 218 that information is being supplied that needs to get passed to a function represented by a function block. One of ordinary skill will recognize that along with SMS and Twitter™ messages, a message from a third-party messaging system may include an e-mail, a Facebook™ message, or any other message sent from a third-party messaging account.

The control system 204 may also include one or more output blocks 220 and 222, each output block 220 and 222 representing a different IoT device, a third-party messaging account, a computing device, or a system, (e.g., a cloud server, etc.). For example, output block 220 represents an IoT device, such as a "smart" light bulb that is connected to a WAN, a LAN, or a PAN. The output block 220 may receive a command or other message from a function represented by a function block and relay the command to the IoT device represented by the output block 220 and associated with a registered UUID.

The IoT device represented by output block 220 then performs a function based on this command. For example, a command may instruct the light bulb represented by output block 220 to turn on or off. The light bulb may be in communication with the tool 200 using a messaging system gateway, connecting via a processing device running an instance of the messaging system interface, and/or by connecting via a mobile device having a mobile gateway installed as described in FIG. 1. Output block 222 represents an Arduino board that receives a command or other message from functions represented by one or more function blocks. The Arduino board may be in communication with the tool 200 by a messaging system gateway, a messaging system interface installed on the Arduino board, and/or a mobile gateway installed on the Arduino board, as described in FIG. 1.

In some embodiments, output blocks do not represent the same IoT device, a third-party messaging account, system, or a computing device as input blocks within a single control system. In other embodiments, a single IoT device, a third-party messaging account, system, or a computing device may be represented by one or more input blocks and/or one or more output blocks within a single control system. In some embodiments, at least one input block or at least one output block in control system 204 designed using tool 200 represents an IoT device.

Control system 204 may also include one or more function blocks 224 and 226, each function block 224 and 226 representing a function configured to process at least a portion of information received from at least one input block. In some embodiments, several function blocks may be arranged in series and/or parallel. When in series, each function represented by a function block may process at least a portion of information received from an input block, either directly or in the form of information processed by another function represented by a function block.

Each function represented by function block 224 and 226 determines which IoT device, third-party messaging account, system, or computing device from which to receive the information based on the UUID associated with the input block. Each function represented by function block 224 and 226 may be configured to provide a command to at least one output block. The functions represented by function blocks 224 and 226 determine which IoT device, third-party messaging account, system, or computing device to provide the command based on the UUID associated with the output block.

Function block 224 may represent a switch, such as an on-off switch, routing received messages based on properties and content of the message. For example, when a message includes the word "on" or "off," the function represented by function block 224 routes the message to an appropriate function block 226. A function represented by function block 226 can deliver a message or command to a connected output block, the message directing the device or system associated with the output block to perform a specified function. Here, a function represented by function block 226 commands a "smart" light bulb to turn off.

In some embodiments, tool 200 includes an information panel 228. Information panel 228 may provide information regarding a particular block. The information may include a type of the block, a UUID or other identifier associated with the block, a name and/or description of an IoT device, third-party messaging system, system, or computing device represented by the block, a description of the function of the block, a message or command type, an operating period and/or interval, whether the block has a repeating function, a status of the block and/or the device or system represented by the block, and/or any other information related to the block. Each type of block in tool 200 may include a distinct group of information and properties that are provided in information panel 228. Information panel 228 is provided as a quick reference as to the function and/or status of each block, and is also useful as a guide to instruct a user how to design a control system using each block.

In control system 204, an input is received from a third-party messaging service, information related to the input is processed, and a command is output to a "smart" light bulb to turn the bulb on or off. In the example control system 204, an input is received by an input block 218 in the form of a SMS message containing a keyword. The input block is connected to function block 224 that relays information, here a keyword, to a function represented by function blocks 226. Based on the keyword received, the information will be passed to a function represented by function block 226 to turn a light on or off. The function represented by function block 226 then provides a command to an output block 220 that turns a light on or off.

Returning to FIG. 1, platform network 110 may be connected with messaging system 102 through a web-based design interface 120, in some embodiments. Web-based design interface 120 may include similar functionality as the designer of the platform network 110, but operates as a web-based application. Users may design control systems and flows on web-based design interface 120 and test the control systems prior to fully deploying a control system into platform network 110.

Users may have access to all IoT devices, other devices or machines, and/or systems associated with messaging system 102 and/or platform network 110, although the processing functions available using the web-based design interface 120 are limited to those provided by a web browser. Web-based design interface 120 may act as a developer design tool that functions through the capabilities of the web browser. A user may then import the control system into platform network 110 for continuous operation of the control system.

Devices or machines, systems, or components thereof that are each assigned individual UUIDs may continuously stream data (e.g., sensor data) to the messaging system 102. The streamed data may be stored in device directory 104, sensor data storage 106, and/or to the analytics database 108. The streamed data from the UUIDs may be reacted upon in real-time. As described in more detail below, UUIDs (and their associated users, devices, systems, or components thereof) or user control systems created using the platform network 110 can subscribe to other UUIDs streaming the data.

Based on thresholds within the data, frequency of occurrence of certain data, or the occurrence of the data itself, events can be created that trigger messages to be exchanged between devices or machines and/or systems. For example, a photo sensor with an assigned UUID that senses a change in light may stream sensor data to the messaging system 102, and a control system created using the platform network 110 may indicate that anytime a change in light occurs, a light with an assigned UUID should be turned on or off.

The control system may subscribe to the UUID of the sensor so that it can detect when a change in light occurs. When the control system senses a light change, it may trigger a message to be sent to the light in order to cause the light to change states (e.g., on or off). In some examples, the sensor data and message exchanges or other transactions may be streamed into the analytics database 108 for real-time, near real-time, and/or offline data analytics.

Figure 3:
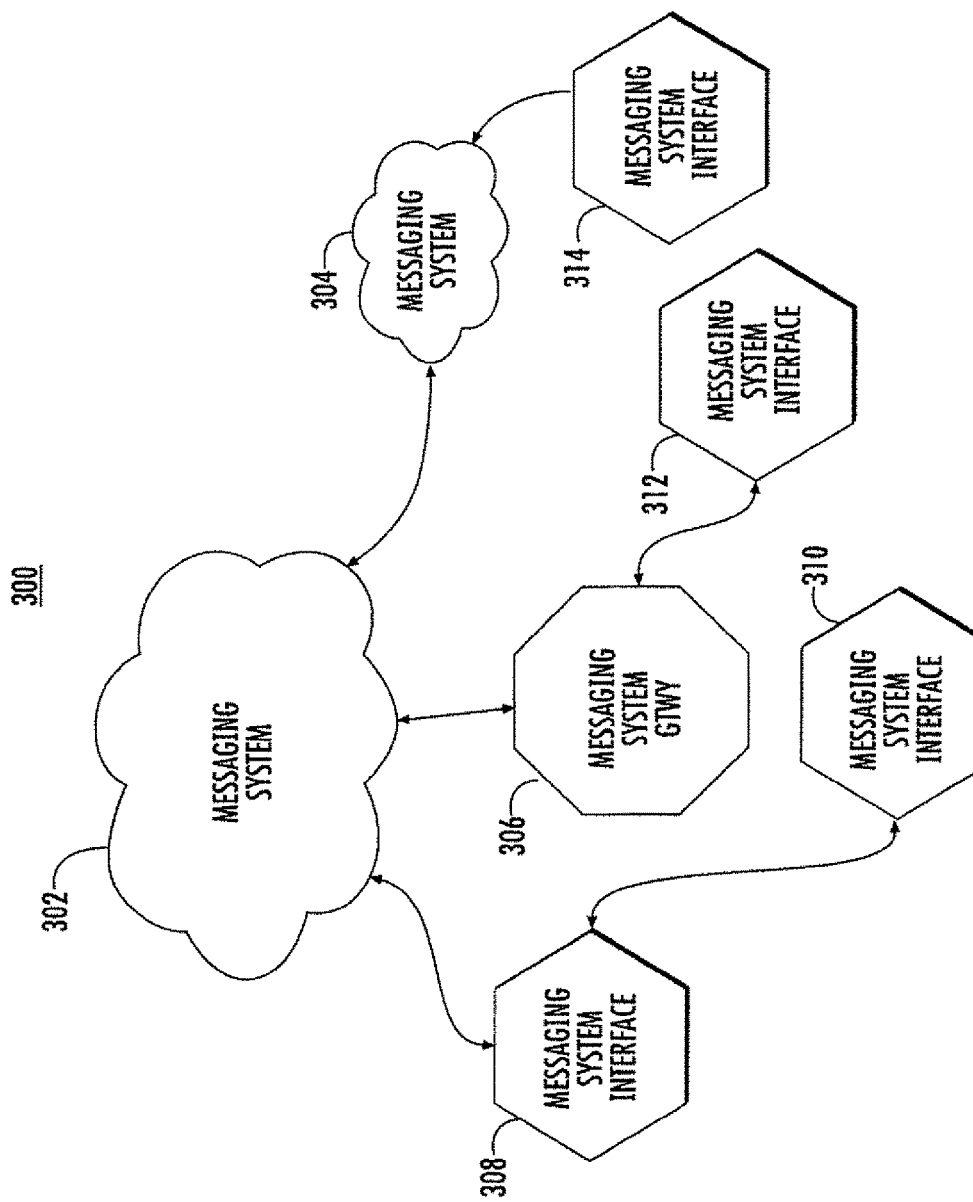
FIG. 3 is a system diagram illustrating an example of a system for exchanging machine-to-machine instant messages between systems and devices or machines, according to some embodiments.

FIG. 3 illustrates an example of a system 300 implementing various components of FIG. 1. The system 300 allows the real-time exchange of machine-to-machine instant messages between devices and/or systems. Network 300 includes a messaging system 302 and a messaging system 304. The messaging systems 302 and 304 may be similar to the messaging system 102 described above with respect to FIG. 1, and may perform one or more of the functions described above. Either of the messaging systems 302 and 304 may be part of a private or a public cloud network. For example, messaging system 302 may be part of a public cloud network with which any device, system, or user may be registered. Messaging system 304 may be part of a private cloud network that is restricted for use by only select devices, systems, or users. For example, the private messaging system 304 may be restricted for use by employees and affiliates of a particular company.

The system 300 may further include one or more messaging system interfaces implemented by one or more machines or devices. For example, the system 300 includes messaging system interface 308, messaging system interface 310, messaging system interface 312, and messaging system interface 314. The messaging system interfaces 308, 310, 312, 314 may be similar to the messaging system interface 116 described above with respect to FIG. 1, and may perform one or more of the functions described above. The messaging system interfaces 308, 310, 312, 314 may each be installed on a separate computing device and integrated with a separate machine or device. For example, the messaging system interfaces 308, 310, 312, or 314 may be installed on a computing device, such as a Raspberry Pi board, an Arduino board, a microcontroller, a minicomputer, or any other suitable computing device.

The computing devices with the installed messaging system interfaces 308, 310, 312, or 314 may then be integrated with separate devices or machines. Accordingly, four machines may each be integrated with a computing device installed with one of the messaging system interfaces 308, 310, 312, and 314. Devices or machines can include any electronic device, including sensors and consumer products such as light bulbs, thermostats, home automation devices, smoke alarms, burglary alarms, an accelerator or other electronic component of a vehicle, a display device, a printer, or any other electronic device.

The system 300 may further include one or more messaging system gateways, including a messaging system gateway 306 and a mobile gateway (not shown). The messaging system gateway 306 may be similar to the messaging system gateway 114 described above with respect to FIG. 1, and may perform one or more of the functions described above. In some embodiments, the messaging system gateway 306 may include a mobile gateway, similar to the mobile gateway 118 described above with respect to FIG. 1. The messaging system gateway 114 may be connected to a local area network (LAN) and/or to a personal area network (PAN).

Any machine that has been assigned a unique identifier (e.g., a UUID) by the messaging system 302 or messaging system 304 and that has the ability to connect to a wide area network (WAN) (e.g., an IoT device) can connect directly to the messaging system 302. In some embodiments, only the messaging system 302 issues unique identifiers to people, machines or devices, systems, or components thereof. In such embodiments, the messaging system 304 may use the unique identifiers that are issued by the messaging system 302. In some embodiments, the messaging systems 302 and 304 are independent messaging systems, and each messaging systems 302 and 304 may issue different unique identifiers. Machines with or without unique identifiers can connect to the messaging system gateway 306. A machine with an assigned unique identifier and the appropriate access level permission can query the network 300 from anywhere in the world for other machines that meet a specific search criteria. The machine may message the other machines via the messaging system 302.

The messaging systems 302 and 304 support inter-cloud communications, allowing machines to route messages across the messaging systems 302 and 304 to devices and sub-devices on other cloud networks. For example, the machine running the messaging system interface 314 is connected to the private messaging system 304 cloud network, and can send a message to a machine running the messaging system interface 308 that is connected to the public messaging system 302. The machine running the messaging system interface 314 may be located in New York, N.Y., and the machine running the messaging system interface 308 may be located in London, England.

The machine running the messaging system interface 314 may send the message to a route of UUIDs corresponding to the path that the message must follow in order to reach the machine running the messaging system interface 308. The route may be included in a routing list that is included in the message (e.g., in a field of the message, such as a header field). For example, the routing list for the message may include a route of UUIDs that includes UUID_MSGSYS 304/UUID_MSGSYS 302/UUID_MSGSYSINT 308. The messaging system 302 may assign the UUID_MSGSYS 304 to the messaging system 304, the UUID_MSGSYS 302 to itself, and the UUID_MSGSYSINT 308 to the machine running the messaging system interface 308. The network servers of the messaging systems 302 and 304, the messaging system gateway 306, and the machines or devices running the messaging system interfaces 308, 310, 312, 314, if included in the route, may each remove their UUID from the routing list and pass the message on to the next UUID in the list until the message arrives at its destination. The same routing technique may be used to send messages within the same messaging system cloud network or across multiple messaging system cloud networks.

In some embodiments, devices or machines can also communicate with other devices or machines via one or more peer-to-peer sockets rather than going through a messaging system 302 or 304. For example, the machine running the messaging system interface 308 may directly communicate with the machine running the messaging system interface 310. One or more dynamic routing protocols may be used by the machines when exchanging communications via a peer-to-peer connection. In some embodiments, devices or machines may discover and be introduced to other devices or machines using the messaging system 302.

After being introduced by the messaging system 302, the devices or machines may then begin a peer-to-peer communications session directly provided they have the proper security permissions. For example, the machine running the messaging system interface 308 may query the messaging system 302 for machines that meets certain criteria (e.g., Philips Hue™ light bulbs in a particular location, or other suitable search criteria).

The messaging system 302 may check the security permissions of the machine running the messaging system interface 308, and may return a list or array of UUIDs assigned to machines that meet the criteria and for which the machine running the messaging system interface 308 has permission to access. One of the machines on the list or array may include the machine running the messaging system interface 310. The machines running messaging system interfaces 308 and 310 may then begin a peer-to-peer communications session to directly exchange messages.

In some embodiments, the messaging system 302 may store various properties of each registered person, machine or device, system, or component thereof that has an assigned UUID. Each registered person, machine or device, system, or component thereof may have a registry store in which the properties may be stored. For example, the registry store for each registered person, machine or device, system, or component thereof may be stored in a device directory similar to the device directory 104 described above. The properties can be anything that describes the person, machine or device, system, or component thereof, including status or state (e.g., on, off, idle, sleeping, or the like), type, color, features, connection protocols, geolocation, or the like.

For example, one or more servers of the messaging system 302 may track how each registered machine or device is connected to the messaging system 302 or to a messaging system gateway (e.g., gateway 306). The messaging system 302 may also track the geolocation of each device or machine. For example, the messaging system 302 may store in a registry store for each machine or device the connection protocol used by each machine or device and the geolocation of each machine or device at a given point in time. The geolocation may be stored as a set of coordinates (e.g., global positioning system (GPS) coordinates, latitude-longitude coordinates, or the like).

The connection protocol and the geolocation may be updated each time either changes. For example, if a machine or device changes locations or connects with the messaging system using a different connection protocol, the messaging system 302 may update the machine's registry store with the updated connection protocol and/or geolocation. In some embodiments, the messaging system 302 can store all of the connection protocols for which a machine or device is configured to operate. The properties may be updated in real-time as the change occurs, or in partial real-time at different points in time (e.g., every 1 minute, 2 minutes, 5 minutes, 30 minutes, 1 hour, or other appropriate period of time).

The messaging systems 302 and 304 operate using one or more native connection protocols. For example, the messaging systems 302 and 304 may natively recognize a HTTP connection protocol, a websockets connection protocol, a MQTT connection protocol, a CoAP connection protocol, an XMPP connection protocol, a SNMP connection protocol, an AllJoyn connection protocol, or any other appropriate connection protocol. One of ordinary skill in the art will recognize that the messaging systems 302 and 304 may natively operate using any other appropriate machine-to-machine connection protocol. Other protocols may be added to the messaging system 302 or 304 over time as the protocols become more universally used.

The messaging system 302 may also include a universal application programming interface that is available for use by all of the native connection protocols of the messaging system 302. The universal application programming interface may be used to interface Internet Things (IoT) devices that use different proprietary application programming interfaces. The universal application programming interface allows the messaging system 302 to avoid having to go through each machine's proprietary cloud network and proprietary application programming interface to facilitate message exchange between machines that use different proprietary protocols to communicate. Without a universal application programming interface, a server may receive a message from a first device that is destined for a second device.

The first device may use a first proprietary connection protocol and application programming interface and the second device may use a second proprietary connection protocol and application programming interface. The server would have to send the message to the proprietary cloud server with which the second device is registered. The proprietary cloud server would then access the application programming interface used by the second device, and send the message to the second device.

Such a procedure of sending the messages to a different proprietary cloud network using different application programming interface requests for each different proprietary protocol used adds latency to the message transport from the first device to the second device. Using the universal application programming interface, the messaging system 302 can receive messages from the first device, and can directly send the messages to the second device (or to a local gateway to which the second device is connected via a LAN or PAN) using a single application programming interface request.

The universal application programming interface supports various commands. For example, the universal application programming interface allows users, machines or devices, systems, or components thereof to get a status of the messaging system 302 (e.g., online, offline, temporarily offline, or the like). The universal application programming interface also allows a machine or device to be registered with the messaging system 302. Upon receiving a registration request, the universal application programming interface may return a UUID and a security token to the registrant.

The universal application programming interface also specifies how queries from users, machines or devices, systems, or components thereof are handled. For example, the universal application programming interface may allow the messaging system 302 to return a list of UUIDs that correspond to a query for different users, machines or devices, systems, or components thereof. As another example, the universal application programming interface may allow the messaging system 302 to return information related to a specific machine or device in response to a query for information relating to the machine or device.

The universal application programming interface also describes how to update features of (e.g., change a location, connection protocol, color, or other feature) or control (e.g., turn on/off, move to a different location, or the like) registered machines or devices in response to requests from users, machines or devices, systems, or components thereof to make the changes (and that have permission to do so). One of ordinary skill in the art will appreciate that the universal application programming interface can specify to the servers of the messaging system 302 how to perform various generic functions that relate to any connected users, machines or devices, systems, or components thereof.

One or more computing devices of the messaging system 302 can route messages to and from any connected machine or device in any supported protocol (whether native or transformed by a plug-in, as described below). The computing devices may include one or more network servers. The messaging system 302 may translate between the different native connection protocols to facilitate message exchanges between machines or devices that operate using different connection protocols.

For example, the common messaging system may translate a received communication that is in a first native connection protocol to a second native connection protocol before sending the communication to a machine or device that only operates using the second native connection protocol or that operates using a connection protocol that is different than the first and second native connection protocols (in which case a plug-in would be needed to convert from the second native connection protocol to the protocol that the machine uses). In one example, a MQTT device can use the messaging system 302 to communicate a message to a CoAP device, a websocket-powered device, or a web page via HTTP. The messaging system 302 can thus interpret or translate the message to the destination device's connected or preferred connection protocol.

In some embodiments, the messaging system gateway 306 may include one or more messaging system plug-ins. In some embodiments, one or more plug-ins may be installed on one or more computing devices, such as a microcontroller, a minicomputer, or any other suitable computing device in the messaging system gateway 306. In some embodiments, one or more plug-ins may be added to one or more existing programs of the messaging system gateway 306.

In some examples, each plug-in may include program code that knows how to interact with the messaging system gateway 306. For example, a plug-in may include a JavaScript piece of code. In some examples, when sending messages from a machine to the messaging system 302, a messaging system plug-in may translate or convert one or more connection protocols that are used by the machine and that are not native to the messaging system 302 to a native connection protocol of the messaging system 302.

When sending messages from the messaging system 302 to the machine, the messaging system plug-in of the gateway 306 may also translate the native connection protocols of the messaging system 302 to the protocols used by the machine. In some examples, a messaging system plug-in may also translate or map one or more proprietary application programming interfaces used by a machine to a universal application programming interface of the messaging system 302. Similar plug-ins may be used in a mobile gateway (e.g., mobile gateway 118), and may perform similar functions as those described herein. For example, a mobile gateway may allow a user to interconnect various devices worn or carried by the user via a PAN provided by the mobile gateway, as described above. One or more plug-ins of the mobile gateway may allow the devices to communicate with the messaging system 302, similar to the plug-ins of the messaging system gateway 306.

To perform the translation, a plug-in may define a message schema that corresponds to the format of the messages required to communicate with a particular machine or device. For example, a message with a command from the messaging system 302 may instruct one or more machines to perform a function, such as to turn off all lights in a room. The message may be transmitted in a general format of the universal application programming interface that is not specific to the proprietary application programming interfaces of the different machines.

The message may also be transmitted by the messaging system 302 using a connection protocol that is not used by the different machines. The proprietary application programming interfaces of the machines may only be configured to receive messages in a certain format, and the message from the messaging system 302 may not be in any of the specific formats. The one or more plug-ins that are used to translate messages for the different machines may translate the message into the format that is required by each of the proprietary application programming interfaces. The plug-ins may also transmit the message to the machines using the proprietary connection protocol for which the machines are configured to operate.

Accordingly, the messaging system gateway 306 supports an open plug-in architecture that translates connection protocols that are non-native to the messaging system 302, such as Phillips Hue™, Nest™, Belkin Wemo™, Insteon™, SmartThings™, or any other appropriate proprietary, legacy, or new connection protocols, to native protocols and/or to a universal application programming interface of the messaging system 302. In some cases, one or more of the machines or devices themselves may include a messaging system plug-in.

Each machine or device that runs proprietary firmware and/or that uses proprietary application programming interfaces can be installed with one or more plug-ins that translate the proprietary communications to and from the connection protocols used by the messaging system 302. The plug-in architecture allows proprietary, legacy (e.g., RS-232 serial, RF, or the like), and/or new machines or devices (e.g., BLE wearable devices or the like) to be registered with and communicate with the messaging system 302 regardless of the connection protocol natively used by the machines or devices.

The messaging system gateway 306 may include multiple plug-ins. For example, a set of machines or devices may be connected to the messaging system gateway 306. Different plug-ins may be used by different subsets of machines or devices that are connected to the messaging system gateway 306. The different subsets of machines may relate to different classes of devices. For example, machines may be broken into classes based on a manufacturer of the devices, a connection protocol and/or application programming interface used by the devices, or any other appropriate classification.

Each of the devices that are connected to the messaging system gateway 306 may be assigned to a logical sub-device that the messaging system gateway 306 keeps track of. The messaging system gateway 306 may assign and map each logical sub-device to a particular plug-in. For example, the messaging system gateway 306 may store a record of all devices, with the record of each connected device including a separate sub-device and plug-in combination. In one example, three Philips Hue lights and two Nest™ smoke alarms may be connected to the messaging system gateway 306 for communicating with the messaging system 302.

The messaging system gateway 306 may have a stored record for each device, including five records. The three records for the three Philips Hue™ lights may each include a separate sub-device (e.g., sub-device_A, sub-device_B, sub-device_C) and a plug-in that is specifically configured to translate between the messaging system 302 native connection protocols and application programming interfaces and the Philips Hue™ connection protocols and application programming interfaces. Similar records may be stored for the two Nest™ smoke alarms, including two records storing a separate sub-device for each smoke alarm (e.g., sub-device_D, sub-device_E) and a plug-in that is configured to translate between the messaging system 302 native connection protocols and application programming interfaces and the Nest™ connection protocols and application programming interfaces. In some embodiments, the messaging system gateway 306 may include a single plug-in that is configured to and may translate between multiple proprietary connection protocols and application programming interfaces.

Working in combination, the messaging system 302 and the messaging system gateway 306 (and/or a mobile gateway) with the plug-ins allow machines or devices to communicate with one another regardless of the proprietary nature of the connection protocols or application programming interfaces that are used by the machines or devices. In the example above including the three Philips Hue™ lights and two Nest™ smoke alarms, a smoke alarm may communicate with one or more of the lights by sending messages to the messaging system 302 via the messaging system gateway 306. For example, when smoke is detected by the smoke alarm, the smoke alarm may transmit a message to the messaging system gateway 306 instructing all of the lights to turn on. A plug-in of the messaging system gateway 306 may translate the message from the proprietary Nest™ format to a generic, native format used by the messaging system 302.

The messaging system 302 may determine a destination for the message by referring to one or more UUIDs that are included in the message. In some embodiments, the messaging system 302 may determine a destination based on a query included in the message. For example, the message may indicate that the message is to be sent to all lights that are located within a particular geolocation (e.g., within a certain distance from the smoke alarm).

Once the messaging system 302 determines that the destination for the message includes the three lights, the messaging system 302 may process the message using the universal application programming interface. For example, the messaging system 302 may authenticate the smoke alarm using its UUID and token combination, and may determine the security permissions of the smoke alarm in order to verify that the smoke alarm has appropriate access to the lights (e.g., that the smoke alarm is permitted to discover and send messages to the lights).

As previously described, the system 300 also includes messaging system interface 308, messaging system interface 310, messaging system interface 312, and messaging system interface 314. The machines running the messaging system interfaces 308, 310, 312, 314 may directly connect with the messaging system 302 or may connect with the messaging system gateway 306 using the universal messaging system interfaces 308, 310, 312, 314. In some embodiments, the machine running the messaging system interface 308 may be a closed-network machine that is designed to communicate with a proprietary network in order to transmit and receive communications to other machines that operate using the same proprietary protocols.

The messaging system interface 308 allows the machine to communicate directly with the messaging system 302 without going through the proprietary network. By communicating directly with the messaging system 302, the machine can communicate with any machine registered with the messaging system 302 regardless of the proprietary nature of the other machines. In some embodiments, the messaging system interfaces 308, 310, 312, or 314 may be an operating system that allows the machine running the messaging system interface 308, 310, 312, or 314 to communicate with the messaging system 302.

The built-in universal messaging system interfaces 308, 310, 312, 314 allow the machine running the universal messaging system interfaces 308, 310, 312, 314 to perform operations that native firmware of the machines does not allow them to perform. For example, the messaging system interface 310 may override the native firmware of its machine to allow the machine to perform various operations that are outside of the functionality of the native firmware. In some embodiments, the messaging system interface 310 may be installed on a machine that does not have the ability to communicate with other machines using one or more connection protocols. In such embodiments, the messaging system interface 310 may provide the machine with the capability to use one or more connection protocols.

The messaging system interfaces 308, 310, 312, 314 may access one or more sensors, inputs, outputs, or programs on the machines running them in order to perform various operations. For example, the messaging system interface 312 may have access to and control a geolocation sensor, a compass, a camera, a motion sensor, a temperature sensor, an accelerometer, a gyroscope, a graphical interface input, a keypad input, a touchscreen input, a microphone, a siren, a display, a light, a tactile output, a third-party messaging service that the machine is able to run, or any other component of the machine that can be identified, accessed, and/or controlled.

The messaging system interfaces 308, 310, 312, 314 may each be assigned a different UUID and token. The messaging system interfaces 308, 310, 312, 314 may connect to the messaging system 302 using the assigned UUID and token, and may await further instructions from the messaging system 302. In some embodiments, the messaging system 302 may act as a compute server that controls the messaging system messaging system interfaces 308, 310, 312, 314. For example, messaging system 302 may activate and/or deactivate pins of the machine running the messaging system interface 314, request sensor data from the machine, and/or cause the messaging system interface 314 to perform other functions related to the machine.

In some embodiments, one or more of the messaging system interfaces 308, 310, 312, 314 can be connected to a gateway (e.g., messaging system gateway 306 or a mobile gateway), and the gateway may act as a compute server that controls the messaging system interfaces 308, 310, 312, 314 in a similar manner as the messaging system 302. In some embodiments, the messaging system interfaces 308, 310, 312, 314 may each be a mobile operating system or application that is able to run on mobile device operating systems, such as iOS and Android™ operating systems.

In some examples, a universal messaging system interface installed on a device (e.g., machine running messaging system interface 310) may allow multiple sensors within the device to interact in a way that the sensors were not designed to operate. For example, a device may include a thermostat. The thermostat may include a motion sensor that is designed to turn on a LED display when motion is detected. The thermostat may also include a controller that controls the temperature of an air conditioning system.

The native proprietary protocol and firmware of the thermostat is not designed to allow the motion detector to be used except to send signals to turn on the LED display as motion is detected. For example, the native proprietary protocol and firmware of the thermostat may not allow the motion sensor and the controller to communicate with one another. The thermostat may be integrated with a computing device (e.g., a Raspberry Pi board, an Arduino board, a microcontroller, a minicomputer, or any other suitable computing device) that has a universal messaging system interface installed on it. The universal messaging system interface allows the sensors of the thermostat to communicate with the messaging system 302. For example, the motion sensor and the controller may be assigned separate UUIDs and tokens. The universal messaging system interface may stream motion data from the motion sensor to the messaging system 302.

The messaging system 302 may perform one or more functions based on the motion data. For example, the messaging system 302 may include a program that sends a message to the controller anytime motion is detected by the motion sensor. The program may be created by a user of the thermostat using the designer graphical interface implemented by the platform network 110 or the design interface 120 described above.

The program may be stored in the messaging system 302, and may access the motion data and convert motion sensor values to a command that is included in the message. The command may instruct the controller to turn the temperature of the air conditioning system to 72 degrees. Accordingly, sensors of the thermostat that are not designed to communicate with one another can exchange messages using the messaging system 302 and a messaging system interface.

Using the techniques and systems described above, IoT devices from different manufacturers can exchange messages even when the devices use different connection protocols or application programming interfaces that may be manufacturer specific. However, IoT device manufacturers may resist the use of such a free-flowing IoT messaging system due to security risks involved with exchanging messages with other manufacturers' devices over various networks. Various security and rights management techniques and systems are thus described herein to alleviate security risks in machine-to-machine messaging systems.

Figure 4:
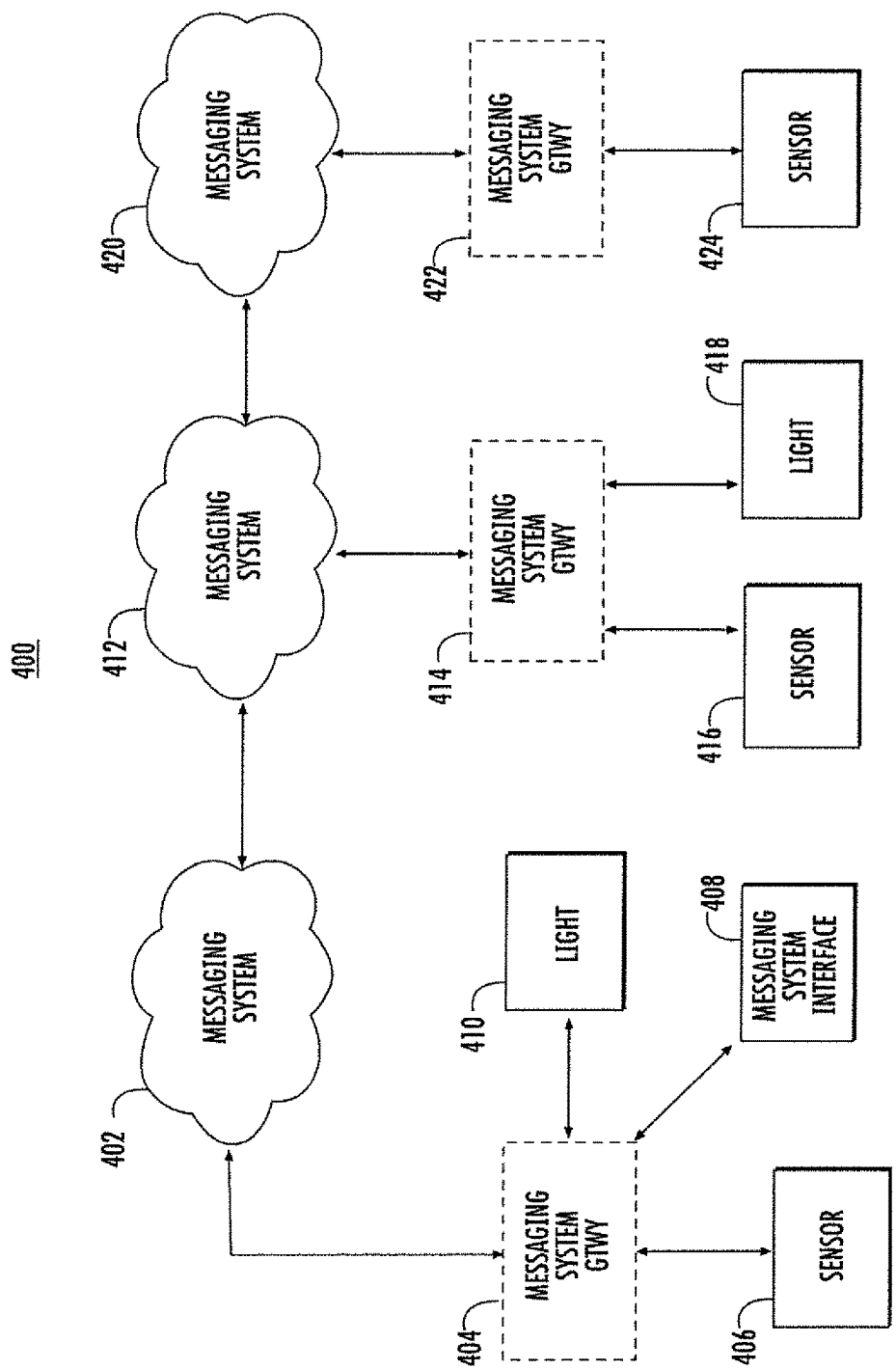
FIG. 4 is a system diagram illustrating an example of a system for exchanging machine-to-machine instant messages between systems and devices or machines using one or more security and rights management techniques, according to some embodiments.

FIG. 4 illustrates an example of a system 400 implementing various components of FIGS. 1 and 3. Various components of the system 400 provide security and rights management to allow secure, real-time exchange of machine-to-machine instant messages between devices and/or systems. Network 400 includes messaging systems 402, 412, and 420. The messaging systems 402, 412, and 420 may be similar to any of the messaging systems 102, 302, or 304 described above with respect to FIGS. 1 and 3, and may perform one or more of the functions described above.

Either of the messaging systems 402, 412, and 420 may be part of a private or a public cloud network. For example, messaging system 402 may be part of a public cloud network with which any device, system, or user may be registered. Messaging systems 412 and 420 may be part of separate private cloud networks that are restricted for use by only select devices, systems, or users. For example, the private messaging system 412 may be restricted for use by a family living in a home, and the private messaging system 420 may be restricted for use by employees and affiliates of a particular company.

Various devices or users may be registered with the messaging systems 402, 412, and 420. For example, messaging system gateway 404, lighting device 410, messaging system interface 408, and sensor 406 may be registered with the messaging system 402. The messaging system gateway 414, sensor 416, and lighting device 418 may be registered with the messaging system 412. The messaging system gateway 422 and the sensor 424 may be registered with the messaging system 420. In some cases, the devices may communicate directly with the messaging systems 402, 412, and 420.

In such cases, any of the messaging system gateways 404, 414, or 422 are optional and may be omitted. Accordingly, the messaging system gateways 404, 414, and 422 are illustrated in FIG. 4 with dotted lines to indicate the optional nature of the messaging system gateways 404, 414, and 422. Any one or more of the devices 406, 408, 410, 416, 418, or 424 may include a messaging system interface, similar to any of the messaging system interfaces 116, 308, 310, 312, or 314 described above with respect to FIGS. 1 and 3, which may perform one or more of the functions described above.

Each of the messaging systems 402, 412, and 420 may be assigned a separate unique UUID and a separate unique token by a messaging system (e.g., one of the messaging systems 402, 412, 420, or another messaging system not shown in FIG. 4). The messaging system gateway 404, the sensor 406, the messaging system interface 408, and the lighting device 410 may be assigned separate unique UUIDs and separate unique tokens by the messaging system 402. The messaging system gateway 414, the sensor 416, and the lighting device 418 may each be assigned a separate unique UUID and a separate unique token by the messaging system 412. Each of the messaging system 422 and the sensor 424 may be assigned a separate unique UUID a separate unique token by the messaging system 420.

The devices may be assigned the UUIDs and tokens when they are registered with the respective messaging systems 402, 412, 420. As described above, the devices can be referenced by the different messaging systems 402, 412, 420 using the UUIDs. Messages can be exchanged among any of the devices illustrated in FIG. 4 by using the different UUIDs. The messaging systems 402, 412, 420 can route messages across a mesh of messaging systems via inter-cloud communications using the routing paradigm described above.

For example, sensor 406 can send a message to lighting device 418 via messaging systems 402 and 412. In this example, messaging system gateway 404 is assigned UUID_1, messaging system 402 is assigned UUID_2, messaging system 412 is assigned UUID_3, messaging system gateway 414 is assigned UUID_4, and lighting device 418 is assigned UUID_5. The sensor 406 can include the path or route UUID_1/UUID_2/UUID_3/UUID_4/UUID_5 in a communication with a desired message.

For example, the route may be included in a routing list that is included in the message (e.g., in a field of the message, such as a header field). As each device or system in the path receives the communication, it will route the communication to the next device in the path. The devices or systems, if included in the route, may each remove their UUID from the routing list and pass the message on to the next UUID in the list until the message arrives at its destination. The devices or systems may route the message based on known connections.

Various security and rights management techniques may be used to ensure that the messages transmitted amongst the devices and systems are secure. In some examples, each of the messaging systems 402, 412, and 420 may maintain separate databases for storing information associated with registered devices, similar to those discussed above with respect to FIG. 1. For example, databases may include a device directory, a sensor data storage database, and/or an analytics database. In some embodiments, the messaging systems 402, 412, and 420 may maintain one or more permissions records in respective device directories of the messaging systems 402, 412, and 420.

Each device or person that is registered with a messaging system 402, 412, or 420, and that has been assigned a UUID and token, may have its own permissions record. A permissions record may include one or more lists, such as a whitelist and/or a blacklist, that are associated with a UUID assigned to a user or person, a device, or a system (or component of a system or device, as described above). In one example, the device directory may maintain a whitelist for a UUID assigned to an IoT device. The whitelist includes a list or array of UUIDs assigned to other devices, users, or systems that are allowed access the IoT device at various levels of access. For example, different levels of access to the IoT device may be granted to other devices, users, or systems, and a separate list or array may be maintained for each level of access.

The whitelist associated with the IoT devices UUID may maintain lists or arrays for the different levels of access, which may include a list or array that includes UUIDs of devices or systems that may discover the device, a list or array of UUIDs of devices or systems that may send a message to the device, a list or array of UUIDs of devices or systems that may receive a message from the device, a list or array of UUIDs of devices or systems that may subscribe to messages sent to and from the device, and/or a list or array of UUIDs of devices or systems that may configure the device.

Accordingly, five levels of access with respect to the IoT device may include the ability to discover the IoT device, the ability to send messages to the IoT device, the ability to receive messages from the IoT device, the ability to subscribe to messages that are received and transmitted by the IoT device, and the ability to configure the IoT device. One of ordinary skill will appreciate that the five levels of access are only examples, and that other levels of access may also be granted.

In another example, the device directory 104 may also maintain a blacklist for a UUID assigned to the IoT device. The blacklist includes a list or array of UUIDs assigned to other devices, users, or systems that are denied access to the IoT device at the various levels of access. In this example, the blacklist for the device's UUID may include a list or array that includes UUIDs of devices or systems that cannot discover the device, a list or array of UUIDs of devices or systems that cannot send a message to the device, a list or array of UUIDs of devices or systems that cannot receive a message from the device, a list or array of UUIDs of devices or systems that cannot subscribe to messages sent to and from the device, and/or a list or array of UUIDs of devices or systems that cannot configure the device.

The discover access permission allows a device, user, or system to discover the presence of another device, user, or system. For example, a device may query a messaging system 402, 412, or 420 for other devices meeting certain search criteria, and the messaging system 402, 412, or 420 may return results of UUIDs of devices to which the device has permission to discover. The send access permission allows a device, user, or system to send messages to a device to which they have the send permission.

The receive access permission allows a device, user, or system to receive messages from a device to which they have the receive permission. In some embodiments, the receive access permission only allows a device to receive broadcast messages broadcast from another device, or messages that are sent directly to the device from the other device. In one example, the permissions record of lighting device 410 may include the UUID of the sensor 424 in its send permissions list, but may not include the sensor 424 UUID in its receive permissions list. As a result, the sensor 424 may send messages to the lighting device 410, but may not receive messages from the lighting device 410.

The subscribe access permission allows a device, user, or system to subscribe to messages of another device, user, or system, essentially allowing the device to eavesdrop on messages going to and from the other device. For example, if a first device has subscribe permissions for a second device, the first device can receive all messages sent from the second device to any device, and all messages sent to the second device from any device.

As described below, a token associated with a user, device, or system UUID may be required to obtain subscribe permissions to the user, device, or system UUID. The configure permission allows a device, user, or system to configure a device, user, or system for which they have the configure permission. For example, a first device may change settings, access permissions, security profile information, owner information, or any other account information of a second device that has the first device in its configuration permissions list.

In some embodiments, a user, device, or system may be required to have particular credentials for accessing or communicating with another a user, device, or system. Different credentials may be required for different types of access permissions. In some examples, different types of credentials may be required to configure a device compared to types of credentials required to discover and send messages to the device. For example, a user, system, or device may need the UUID of the device in order to discover the device or to send messages to the device. However, a user, system, or device may need the UUID and the token associated with the UUID of the device in order to configure the device.

Thus, in addition to being on the configure permissions list of a particular UUID, a user, device, or system also needs the token associated with the UUID to configure the user account, device, or system assigned with the UUID. In some examples, different credentials may also be needed to subscribe to a device as compared to credentials needed to receive messages from the device. For example, a user, system, or device may need the UUID of the device in order to receive messages from the device, but may need the UUID and the token of the device in order to subscribe to all messages transmitted to and received from the device.

As previously described, UUIDs can receive messages from other UUIDs with or without tokens (provided security permissions allow it). However, by having a device's UUID and token, a person, device, or system can eavesdrop on the device's inbound and outbound communications in an eavesdropping mode. Subscribing without the device's token may only allow the subscribing device access to receive the messages broadcast by the device (provided the receive security permission allows it).

The use of whitelists and blacklists ensures that devices, systems, and users only have access to those UUIDs of devices, systems, and users for which permission has been granted. A user may designate the permissions record for the user, a device, or a system when the user, device, or system is registered with a messaging system 402, 412, 420. In some embodiments, a user may modify a list of a permissions record at any time, assuming the user has the appropriate access permission to configure the particular permissions record.

In some embodiments, if UUIDs of users, devices, or systems are not designated for a particular access level in a permissions record associated with a user, device, or system, then the permissions record may be left open for all UUIDs that are able to connect with the user, the device, or the system. For example, if there are no UUIDs designated in a whitelist for the receive permission associated with a UUID of a device, any interested UUID can receive broadcast messages from the device. The access levels that require tokens (e.g., subscribe, configure, or the like) may not be left open, such that only users, devices, or systems that have the token of a user, device, or system are granted permission to the access level of the user, device, or system.

The respective messaging system 402, 412, 420 for which a device (e.g., an IoT device) is registered may check a permission record of the device before allowing a message to be transmitted to or received from the device. Continuing with the example above, sensor 406 can send a message to lighting device 418 via messaging systems 402 and 412 by including the path or route UUID_1/UUID_2/UUID_3/UUID_4/UUID_5 in a communication (e.g., in a field of the message, such as a header field) that includes the message payload. A message payload may include the actual contents of the message. A message may further include a message envelope with various information (e.g., in a header of the message), such as a to-identifier, a from-identifier, a timestamp, or other information that is in addition to the payload that includes the contents of the message (e.g., a command).

One or more of the messaging systems 402 and 412 may check the permissions records of the sensor 406 and the light 418 to make sure the devices have permission to communicate with each other. For example, the messaging system 402 may check the permissions record of sensor 406 to determine whether the lighting device 418 has receive permissions to receive a message from the sensor 406. The messaging system 412 may further check the permissions record of the lighting device 418 to determine whether the sensor 406 has send permissions to send messages to the lighting device 418. In the event the sensor 406 and the lighting device 418 have the appropriate access permissions, the messaging systems 402 and 412 will allow the communication to be routed from the sensor 406 to the lighting device 418 according to the path or route.

In some embodiments, a UUID can be an owner of one or more other UUIDs. For example, a UUID associated with a person may be an owner of the sensor 406, the messaging system interface 408, and the light 410. In some examples, the person can be designated as the owner when the sensor 406, the messaging system interface 408, or the light 410 is registered. For example, when registering messaging system interface 408, the person may associate their UUID as an owner of the UUID associated with the messaging system interface 408, indicating that the person is the owner of the messaging system interface 408.

In some examples, the person can be designated as the owner of the sensor 406, the messaging system interface 408, or the light 410 at a point in time after the devices are registered. For example, the person may log into an account, and can search (e.g., using a graphical interface, a mobile application, or the like) for any UUIDs of which the person wants to become the owner. The person may search for specific UUIDs that the person is aware of, or can search for UUIDs that belong to a particular network that the person is an owner of or is otherwise affiliated with. One or more UUIDs may be displayed (e.g., using a graphical interface, a mobile application, or the like) based on the search, and the person may select or otherwise claim one or more of the UUIDs to designate the person's UUID as an owner of the UUIDs.

The one or more other UUIDs may be associated with a device, system, or user registered with a messaging system 402, 412, or 420. In some embodiments, a UUID associated with a device or system may be an owner of one or more other UUIDs. For example, a UUID associated with the messaging system gateway 422 may be an owner of the UUID associated with the sensor 424. In some embodiments, a device, user, or system may be required to have the UUID and token of another device, user, or system before becoming an owner of the other device, user, or system.

In some embodiments, a device, user, or system may only claim UUIDs of other devices, users, or systems that are attached to the same network as the device, user, or system. For example, a user may only be able to claim a UUID of a device, and thus become an owner of the device, if the device is behind the same public IP address as the user (e.g., a public IP address used by a network address translation firewall of a router or access point providing network connectivity to the user and the device).

In some embodiments, once a UUID is designated as an owner of one or more other UUIDs, the owner UUID has all access permissions to the one or more UUIDs for which it is an owner. When logged into an account, an owner may view all UUIDs for which it owns (e.g., using a graphical interface, a mobile application, or the like), and may access or control the user account, device, or system associated with the UUIDs.

Using the access permissions above, only certain devices, users, or systems are permitted to access other devices, users, or systems at different levels of access. For example, a person may be permitted to access devices located at the person's place of employment at discover, send, and receive levels of access, but not at a configure level of access. The person may own all devices or systems located at the person's home, and may thus have all levels of access to those devices and systems (e.g., discover, send, receive, subscribe, configure, or any other level of access).

The person can control the access permissions of the devices or systems they own, and can thus determine who and what other devices or systems can access the owned devices or systems at certain access levels. For example, the person may grant the person's family discover, send, receive, and subscribe permissions, but not configure permissions. As another example, the person may grant guests discover and send permissions only. Every device, user, or system that is registered with a messaging system 402, 412, or 420 is associated with a permissions record, and thus can easily control how they are accessed by other devices, users, or systems.

Another security mechanism may include message transport encryption. In some examples, transport of messages among the devices and systems of FIG. 4 may be encrypted. To secure transport of messages, one or more certificates may be used to authenticate communications from one device to another device. For example, cryptographic protocols, such as transport layer security (TLS) certificates, secure sockets layer (SSL) certificates, or the like, may be provided to all devices and systems using any protocol.

In some cases, checksums of a message may be calculated by devices when the message is transmitted and when the message is received. The checksums may be compared by the devices to insure that the message was not manipulated in transit. Using a cryptographic transport protocol to encrypt messages in transit, all messages transmitted among devices 404, 406, 408, 410, 414, 416, 418, 422, 424 and messaging systems 402, 412, 420 are encrypted such that only devices and systems that have the proper certificates can decrypt and read the messages, thus ensuring that third party devices or systems cannot eavesdrop or tamper with messages.

In one example of encrypting message transport, the sensor 406 may wish to send a message to the lighting device 418. The sensor 406 may send the message to the messaging system gateway 404, and the gateway 404 may then send the message to the messaging system 402. In an alternative embodiment, the sensor 406 may send the message directly to the messaging system 402. In the event the sensor 406 sends the message directly to the messaging system 402, the sensor 406 may perform the steps below described with respect to the gateway 404. The messaging system gateway 404 may agree to exchange messages with the messaging system 402 using a cryptographic protocol, such as TLS.

The gateway 404 and the messaging system 402 may then negotiate a connection by using a handshaking procedure to establish various parameters that are used to establish the secure connection. For example, the gateway 404 may send the messaging system 402 a SSL version number, one or more cipher settings, session-specific data, and other information specific to the gateway 404 that the messaging system 402 can use to communicate with the gateway 404. The messaging system 402 may then send the gateway 404 a SSL version number, one or more cipher settings, session-specific data, and other information related to the messaging system 402 that the gateway 404 can use to communicate with the messaging system 402.

The messaging system 402 may also send its certificate to the gateway 404. The certificate may include a digital certificate that binds the messaging system's 402 identity to the messaging system's 402 public key and that is signed by a certification authority trusted by both the messaging system 402 and the gateway 404. In the event the gateway 404 is requesting access that requires authentication, the messaging system 402 may request the certificate of the gateway 404. The gateway 404 may use the information sent by the messaging system 402 to authenticate the messaging system 402.

Once the messaging system 402 is authenticated, the gateway 404 may generate a code for the session and may encrypt it with the messaging system's 402 public key from the certificate received from the messaging system 402. The gateway 404 may then send the encrypted code to the messaging system 402. In some embodiments, the gateway 404 may authenticate itself to the messaging system 402 by signing data that is unique to the handshake between the gateway 404 and the messaging system 402 and that is known by both the gateway 404 and the messaging system 402.

The gateway 404 may send both the signed data and the gateway 404 certificate to the messaging system 402 along with the encrypted code. In some embodiments, the messaging system 402 may also authenticate the gateway 404.

The messaging system 402 may then use a private key to decrypt the encrypted code, and may generate a master code. The gateway 404 may also generate the master code using a private key.

The gateway 404 and the messaging system 402 use the master code to generate session keys. The session keys include symmetric keys that may be used to encrypt and decrypt information exchanged during the secure session. The session keys may also be used to verify the validity or integrity of the session in order to detect whether any changes occur in the data while in transit from the gateway 404 to the messaging system 402. For example, the session keys may be used to detect if a third-party device has intercepted data sent from the gateway 404, and then retransmitted the data to the messaging system 402 in a modified form.

In some embodiments, the gateway 404 and the messaging system 402 may exchange messages indicating that all future messages will be encrypted using a session key, and that the handshake process has completed. While the message transport security described above uses the messaging system 402 and the messaging system gateway 404 as examples, one of ordinary skill in the art will appreciate that a similar technique may be used to secure transport of messages between any other device and/or system of FIG. 4.

In some examples, the payload of a message may be encrypted. For example, as previously described, a message envelope may include a payload, a from-identifier, a to-identifier, a timestamp, or other information. The from-identifier may include the UUID of the sender of the message, and the to-identifier may include the UUID of the destination of the message. The payload portion of the message envelope may include the actual contents of a message intended for the destination device, such as a command or other information.

The messaging systems 402, 412, 420 and any other devices or systems that are used to route messages may only be interested in routing messages, but not reading the contents of messages. In such examples, the routing systems and devices may only need to read the address to which a message is destined (the to-identifier), and may also read an address from which a message is transmitted (the from-identifier, if present in the message communication). Accordingly, the payload of certain messages may be encrypted such that only the destination device, or other authorized system or device, may be able to read the payload. Various encryption techniques may be used, including Advanced Encryption Standard (AES), Data Encryption Standard (DES), using public keys, using private or symmetric keys, or any other appropriate encryption technique.

In some embodiments, certain restrictions may be associated with a device, user, or system registered with a messaging system 402, 412, or 420 that restrict how or when the device, user, or system can communicate with other devices. Restrictions may include timing restrictions, location restrictions, message envelope restrictions, path restrictions, information throttles, presence restrictions, or any other appropriate restriction. A UUID may designate restrictions for one or more other UUIDs that have access permissions to the UUID. For example, a UUID may store a list of restrictions for any other UUID that has access permissions to the UUID. A UUID's restrictions may be stored in a device directory associated with the UUID.

In some embodiments, a messaging system 402, 412, or 420 may enforce the restrictions upon receiving a message by either allowing the message or denying the message. In some embodiments, a messaging system gateway 404, 414, or 422 may enforce the restrictions. In some embodiments, a device (e.g., sensor 406, lighting device 410, messaging system interface 408, or any other device shown in FIG. 4) may enforce the restrictions before routing the message to another device or system, or before processing a payload of a message destined for the device.

Timing restrictions may include certain times that a device, user, or system may be accessed. In one example, a first UUID of a first device, user, or system may have timing restrictions associated a second UUID of second device, user, or system. The timing restrictions may indicate certain times for which the second UUID can access the first UUID according to the particular permissions record of the first UUID. For example, the timing restrictions may only allow the second UUID to access the first UUID for a particular week out of the year (e.g., December 23 at midnight through Dec. 28, 2013 at midnight). At times outside of the particular time period, the second UUID may not be allowed to access the first UUID at any permission level, unless otherwise permitted according to the permissions record of the first UUID.

Location restrictions may limit the location or locations at which a device, user, or system may be accessed by other devices, users, or systems. In one example, a first device, user, or system may only be accessed by a second device, user, or system when the first device, user, or system is present at a certain location. In another example, a first device, user, or system may only be accessed by a second device, user, or system when the second device, user, or system is present at a certain location.

Accordingly, a location restriction restricting how a first device, user, or system is accessed may apply to the location of the first device, user, or system, or may apply to the location of a second device, user, or system accessing the first device, user, or system, or may apply to both. Location may be determined based on a device's IP address using a geolocation determination technique. For example, an IP address of a device may be analyzed to determine a latitude-longitude position or GPS coordinates of a device.

In some examples, the location may be determined by locating a router or access point providing network service to the device (e.g., using a geolocation service that analyzes service set identifiers or a router, or the like), and associating that location with the device. One of ordinary skill in the art will appreciate that other location techniques may be used, such as triangulation or trilateration using signals from access points, routers, other devices, or cellular towers. In one example using location restrictions, a first UUID associated with a first device may provide discover, receive, and send access permissions for a second UUID associated with a second device.

The first UUID may also have location restrictions for the second UUID indicating that the second UUID can only access the first UUID when the second UUID is at a particular location. For example, the first device may include a printer located at a business, and the second device may include a computer belonging to an employee of the business. The employee may only be able to discover, receive messages from, or send messages to the printer when the computer is located within a building of the business, within network access of a network of the business, or the like.

In another example, a UUID may have a location restriction that indicates all UUIDs located in a specific country, city, continent, or other location are blacklisted from one or more access permissions of the UUID. For example, any device, user, or system with a UUID located in the location may be unable to receive or send messages to a UUID with such a restriction, and may also be unable to configure or discover the UUID with the restriction.

In another example, a UUID may have a location allowance that indicates any UUID located in a specific country, city, continent, or other location are whitelisted for one or more of the UUID's access permissions. For example, any device, user, or system with a UUID located in the location may receive messages from, send messages to, or discover the device.

Message envelope restrictions may be designated that control or limit the information that a device, user, or system may send to or receive from other devices, users, or systems. For example, a message envelope of a message may be interrogated by a messaging system 402, 412,420 or a messaging system gateway 404, 414, 422 to determine whether a payload within the message envelope meets any message envelope restrictions that restrict certain types of information that may be designated by a sending or a receiving device.

In some embodiments, a device (e.g., sensor 406, lighting device 410, messaging system interface 408, or any other device shown in FIG. 4) may interrogate a message envelope to determine whether a payload or other portion of the message envelope is restricted, and may enforce the message envelope restrictions before routing the message to another device or system, or before processing a payload of a message destined for the device.

In one example, a first UUID of a first device may have access permissions associated with a second UUID of a second device that allow the second device to send messages to the first device. The first device may include a drug dispenser and the second device may include an interface that indicates a drug and how much of the drug to dispense to a patient. The first UUID may have a message envelope restriction that restricts which type of drug and the amount of the drug that it will dispense.

A message envelope of a message sent from the interface may be interrogated to ensure that a payload designating a particular amount of a drug to dispense is within the designated restrictions. The message envelope restriction thus prevents the wrong drug or the wrong amount of the drug from be administered to the patient. For example, a messaging system 402, 412, 420 or a messaging system gateway 404, 414, 422 may determine whether the payload meets the message envelope restrictions before sending the message to the drug dispenser. In some embodiments, the drug dispenser may interrogate the message envelope upon receiving the message to ensure the restrictions are met.

A message envelope restriction in a device directory of a UUID may apply to all UUIDs, or may be specific to particular UUIDs of devices, users, or systems that may access the UUID. In embodiments in which a payload is encrypted, a messaging system 402, 412, 420, a messaging system gateway 404, 414, 422, or a device (e.g., any device shown in FIG. 4) may have a key, a certificate, or other credential that can be used to decrypt the payload in order to determine whether the payload meets any message envelope restrictions. In another example, the message envelope of a message may include a from-identifier and a to-identifier.

The from-identifier may include a UUID of the device, user, or system sending the message, and the to-identifier may include a UUID of the destination device, user, or system ultimately receiving the message. A from-identifier may be analyzed to determine whether the sending device, user, or system is authorized to send the message. For example, the message envelope may be interrogated to determine whether the identifier in a from-identifier field includes a UUID of an approved sending device, user, or system (e.g., according to a destination device's permissions record). A to-identifier may be analyzed to determine whether the destination device, user, or system is authorized to receive the message. The message envelope may be interrogated to determine whether the identifier of a to-identifier field includes a UUID of an approved destination device, user, or system (e.g., according to a sending device's permissions record).

Path restrictions may be designated that restrict the path that a message can take to reach a destination. For example, a device associated with a UUID may only accept a message if it travels through a first viable path of devices or systems, but not if the message travels through another viable path. In some embodiments, a path restriction may indicate that any message that is routed through a device or system located in a specific place or location will be rejected.

For example, if a message was routed through a device or system located in a particular country, the message may be rejected. In some embodiments, a path restriction may restrict messages from traveling through a particular UUID associated with a device or system. For example, the sensor 406 may send a message to the UUID assigned to sensor 424. The sensor 406 may have a path restriction indicating that the messaging system 412 is blacklisted from being in a transmission path for the sensor's 406 messages. The message may thus be transmitted from the messaging system 402 to the messaging system 420, without being routed through the messaging system 412.

In some embodiments, a UUID may be put on a path whitelist for another UUID. For example, the sensor 406 may send a message to the UUID assigned to sensor 424, and may have the messaging system 412 on its path whitelist. Accordingly, the message may be routed through the messaging system 412 on its way to the sensor 424. In some cases, the message may be required to travel through a UUID that is on another UUID's path whitelist. For example, the message transmitted by the sensor 406 may be required to travel through the messaging system 412 in route to the sensor 424. In some embodiments, a path restriction may restrict messages from traveling through a particular type of device or system. In some embodiments, a UUID for a user, device, or system may store a list all acceptable paths that will be accepted.

In some embodiments, a UUID for a user, device, or system may store a list of all unacceptable paths, locations, or UUIDs within a path that will cause rejection of a message. In some embodiments, a from-path may be included in a communication to indicate the path that a message takes from an originating device or system to a destination device or system. For example, a communication may include a header with a source address (e.g., a from-identifier, a MAC address, or other unique identifier) of an originating device or system, a destination address (e.g., a to-identifier, a MAC address, or other unique identifier) of a destination device or system, and a from-path with the path. The from-path may be analyzed to determine whether the path meets any path restrictions.

Presence restrictions may be established that allow messages to be sent from or to a device, user, or system when the device, user, or system is online (e.g., connected to and/or authenticated by a messaging system 402, 412, or 420). A device, user, or system that is not connected to a messaging system may be considered offline. In one example, the sensor 424 may only be able to transmit a message to the lighting device 410 when the lighting device 410 is connected to messaging system 402. In another example, a person may specify a presence restriction that requires a device to be online for the device to send the person a message. Such an embodiment may be used to eliminate the chance of message spoofing.

In some embodiments, a messaging system 402, 412, or 420 may establish one or more information throttles that may restrict the amount of information that can be exchanged, a number of requests for information that can be made, or the like. For example, a throttle may indicate that only a certain amount of messages during a period of time (e.g., ten messages per second, or any other amount during a period of time) can be sent from any UUID registered with a messaging system 402, 412, or 420. In another example, a throttle may indicate that any UUID cannot attempt to connect (e.g., by requesting authorization from a messaging system) more than a certain amount of times during a period of time (e.g., no more than twice per second, or any other amount during a period of time).

One of ordinary skill in the art will appreciate that any other throttles may be set up to restrict abuse of the messaging systems 402, 412, or 420. In some examples, using such throttles may prevent denial of service attacks, unauthorized access attempts, or any other type of malicious activity. In some embodiments, certain UUIDs may be exempted from being subject to one or more throttles. For example, a UUID associated with the messaging system 402 may be exempt from any information throttles. In some embodiments, throttles may be limited to certain users, devices, or systems. For example, a certain type of device manufactured by a particular manufacturer may be subject to a specific throttle. In one example, if home automation devices of a particular type that are manufactured by manufacturer a typically report certain information every forty seconds, then a throttle may be set up for any home automation devices of that type. The throttle may restrict the frequency of reports to one every forty seconds.

In some embodiments, a throttle may be dynamically adjusted. For example, a messaging system 402 may change a message limit from ten messages per second to five messages per second if a security breach is detected by a device or system transmitting messages at a rate of less than ten messages per second. The messaging system 402 may automatically change a throttle, or a user (e.g., an administrator or owner of the UUID associated with the messaging system 402, other user with configuration permissions to the UUID associated with the messaging system 402, or the like) may log into an account of the UUID associated with the messaging system 402 to change a throttle. Various actions may be taken when a throttle is determined to be exceeded by a device, user, or system associated with a UUID, which will be discussed further below.

Figure 5:
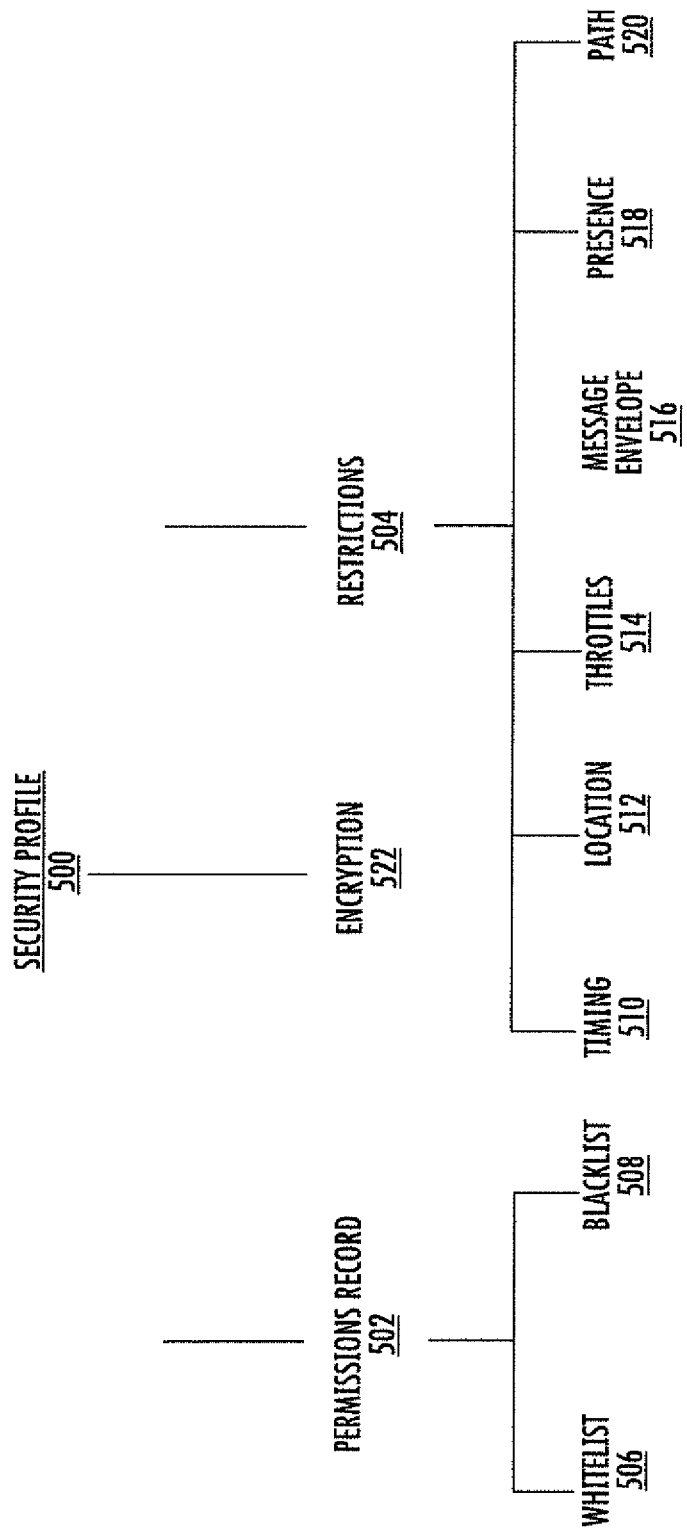
FIG. 5 is a line diagram illustrating an example of a security profile associated with a unique identifier of a device, user, or system, according to some embodiments.

In some embodiments, one or more security profiles may be associated with a UUID assigned to a device, user, or system. FIG. 5 illustrates one example of a security profile 500 associated with a UUID. The security profile 500 includes a permissions record 502, restrictions 504, and encryption information 522. The permissions record 502 includes a whitelist and a blacklist, similar to those discussed above. The restrictions 504 include timing restrictions 510, location restrictions, 512, information throttles 514, message envelope restrictions 516, presence restrictions 518, and path restrictions 520.

The various permissions and restrictions may be used to provide customized security options for a UUID. For example, a user may specify a presence restriction and a location restriction for a UUID assigned to the user's front door lock that requires the user to be near the user's home (e.g., within 1 foot, 5 feet, 10 feet, or some other appropriate distance or proximity) and requires the user's phone to be online before the door lock allows the user to enter the home. One of ordinary skill will appreciate that any other combination of permissions and restrictions may be specified. In some embodiments, the security profile 500 may not include information throttles 514. For example, information throttles, in some embodiments, are applied to all devices, users, or systems registered with a messaging system 402, 412, 420, and may thus be omitted from the security profile 500.

The encryption information 522 may include any types of encryption that are used by the UUID. The security profile 500 may be stored in a device directory of a messaging system with which the UUID is registered. The security profile 522 may be accessed to determine whether a message is authorized to be sent, or any other access is granted, to the device, user, or system associated with the UUID.

In some embodiments, a UUID assigned to a device, user, or system may be associated with multiple security profiles. For example, different security profiles associated with the UUID may be applied to different groups, such as a company, a service or carrier, a device or groups of devices, a person or group of people, or any other appropriate group. For example, a UUID assigned to a company may have multiple security profiles. One security profile for the company may be assigned to one type of employee, and another security profile may be assigned to a different type of employee.

The different security profiles allow the different types of employees to access company devices and systems at different levels of access, using different restrictions, and possibly using different encryption levels. In another example, one or more devices with different assigned UUIDs may assign one or more security profiles to a company to grant the company with access to the devices. In some embodiments, a UUID assigned to an owner of the devices may grant a single security profile to the company that applies to all of the devices.

In some embodiments, the respective UUIDs for each of the devices may assign a separate security profile that is specific to each device to the company. For example, a UUID assigned to a utility company (e.g., a server of the utility company, a person at the utility company, or any other appropriate device, user, or system) may be granted access to an air conditioning and heating unit by the owner UUID or by a UUID assigned to the air conditioning and heating unit.

The access by the utility company may be limited by a particular security profile associated with the UUID of the owner or the UUID of the air conditioning and heating unit. For example, the security profile may allow the utility company to send messages to and receive messages from the air conditioning and heating unit, but only during certain days of the week and during certain times of those days (e.g., during days and times when the owner works, or other appropriate days and times). Other restrictions may include message envelope restrictions that limit the amount that the utility company can adjust the air conditioning and heating unit.

Using these access permissions, the utility company may send messages to adjust the air conditioning and heating unit to cool the owner's home on a hot day with temperatures over 75 degrees. For example, the air conditioning and heating unit may send one or more messages to the utility company indicating the temperature within the home, and the utility company may determine when to adjust the air conditioning and heating unit accordingly. The utility company may also determine when to adjust the air conditioning and heating unit based on the temperature at the location of the home (e.g., based on weather forecasts, a thermometer, or other indicators whether at the home's location). In another example, a sensor device (e.g., an alarm system, a motion sensor, a camera, or the like) with an assigned UUID may determine that the owner is not at home, and may send a message to the utility company or the air conditioning and heating unit to indicate that the user is not home.

The security profile for the UUID of the air conditioning and heating unit (or the owner) may prevent the utility company from sending messages to the air conditioning and heating unit when the owner is not home. The sensor device, or another device, may determine a location of the owner (e.g., by determining a location of a mobile device, a wearable device, or other device carried by the owner). The sensor device or other device may determine when the owner is a certain distance or time from the home, and may send a message to the utility company or the air conditioning and heating unit to adjust the temperature at that time.

In some embodiments, a messaging system 402, 412, 420, a messaging system gateway 404, 414, 422, or other device may determine when an unauthorized message attempt occurs from a device, user, or system. An unauthorized message attempt may be based on various factors. In some examples, an unauthorized message attempt may be determined by analyzing a permission record, analyzing one or more restrictions, or analyzing a security profile (if present) associated with a UUID. For example, a messaging system 402, 412, 420, a messaging system gateway 404, 414, 422, or other device may detect when a UUID lacks a proper credential or security certificate to exchange a message with another UUID.

In another example, a messaging system 402, 412, 420, a messaging system gateway 404, 414, 422, or other device may detect when restrictions have not been met by a particular message. In yet another example, a messaging system 402, 412, 420, a messaging system gateway 404, 414, 422, or other device may determine when a message does not meet the requirements of a permissions record. In another example, an analytics system may be queried to determine whether any unauthorized message attempts have been made by any devices.

In one example, the sensor 406 may be part of a user's device and the lighting device 418 may be located in an owner's home that the owner is renting to the user. The user may attempt to use the sensor 406 to send a communication with a message to the lighting device 418. The messaging systems 402 and/or 412 may access the security profile of the UUID associated with the sensor 406 and the security profile of the UUID associated with the lighting device 418 to determine whether the message meets the security requirements specified in the security profiles. For example, the messaging system 402 or 412 may determine whether the access permissions associated with the sensor's 406 UUID allow the lighting device 418 to receive messages from the sensor 406.

In some examples, the receive permission list in the access permissions of the sensor 406 may include the UUID of the lighting device 418. In some examples, the receive permission list may be left blank, indicating that the receive permissions for the sensor 406 UUID are open. In some embodiments, the messaging system 402 or 412 may determine whether the access permissions associated with the UUID of the lighting device 418 allow the sensor 406 to send messages to the lighting device 418. In some examples, the send permission list in the access permissions of the lighting device 418 may include the UUID of the sensor 406. In some examples, the send permission list may be left blank, indicating that the send permissions for the lighting device 418 UUID are open.

In another example, the messaging system 402 or 412 may access the restrictions in the security profile of the sensor 406 UUID, and may determine that an unauthorized message attempt has occurred when the message violates any of the restrictions. For example, the owner may include a timing restriction that restricts the use of the lighting device 418 by the user to a certain week during which the user is renting the home. The owner may also include other restrictions, such as a message envelope restriction that limits the user's control of the lighting device 418 to on and off, not allowing the user to dim or brighten the lights.

In some embodiments, one or more analytics systems (e.g., analytics database 108) accessible by one or more of the messaging systems 402, 412, 420 may aggregate large amounts of data from the devices registered with each messaging system 402, 412, 420. The one or more analytics systems may be used to detect certain events or anomalies that indicate an unauthorized message attempt. For example, a messaging system 402 may query an analytics system or database for any message attempts that exceed a throttle restriction. The analytics system may return results of any UUIDs that have attempted to send messages in a way that violates a throttle.

Various actions may be taken when an unauthorized message attempt is detected. For example, a messaging system 402, 412, or 420 may disable or prevent a UUID associated with a device, user, or system from exchanging communications with any other devices, users, or systems when an unauthorized message attempt is detected. Any messages communicated to or from the device, user, or system may be rejected to prevent the unauthorized message attempt. For example, if a predetermined number of unauthorized message attempts are detected from a device, the device may be prevented from exchanging communications with any other devices using one or more of the messaging systems 402, 412, or 420.

In some embodiments, a UUID of a device, user, or system may be removed or unregistered from a messaging system 402, 412, or 420 upon detecting a predetermined number of unauthorized message attempts. For example, if more than twenty unauthorized message attempts are detected from a device, the device may be unregistered. One of ordinary skill in the art will appreciate that any number may be designated as a limit on unauthorized message attempts.

In some embodiments, a messaging system 402, 412, or 420 may transmit a notification to a device, user, or system when another device, user, or system attempts to send an unauthorized message to the device, user, or system. In some embodiments, a messaging system 402, 412, or 420 may store a record of unauthorized message attempts. The record may be queriable. One of ordinary skill in the art will appreciate that various other functions may be performed in response to detection of one or more unauthorized message attempts by a device, user, or system.

FIG. 6 illustrates an embodiment of a process 600 of detecting unauthorized message attempts. In some aspects, the process 600 may be performed by a computing device, such as one or more network servers of the messaging systems 102, 302, 304, 402, 412, or 420 shown in FIGS. 1 and 3-4. While specific examples may be given of a network server performing the process 600, one of ordinary skill in the art will appreciate that other devices may perform the process 600.

Process 600 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 602, the process 600 includes receiving, using a computing device, a communication from a first Internet of Things (IoT) device, wherein the communication is destined for a second IoT device. The first IoT device is assigned a first universally unique identifier, and the communication includes a second universally unique identifier assigned to the second IoT device. Using FIG. 4 as one example, a computing device (e.g., a network server) of the messaging system 402 or a computing device of the messaging system 412 may receive the communication from the messaging system interface 408. The communication may be destined for the light 418.

The communication may be sent to the messaging system 402 via the messaging system gateway 404, or directly from the messaging system interface 408. The messaging system 402 may then send the communication to the messaging system 412. The communication may include the unique identifier (e.g., a UUID) assigned to the messaging system interface 408 and the unique identifier assigned to the light 418. One of ordinary skill in the art will appreciate that any of the devices or systems illustrated in FIG. 4 may send a communication to another device or system.

At 604, the process 600 includes obtaining the second universally unique identifier. Using the example above, the computing device of the messaging system 402 and/or the computing device of the messaging system 412 may obtain the second universally unique identifier from the communication sent by the messaging system interface 408. At 606, the process 600 includes determining that the second universally unique identifier is assigned to the second IoT device. For example, the computing device of the messaging system 402 or the computing device of the messaging system 412 may refer to a device directory entry corresponding to the second universally unique identifier, and may determine from the entry that the second universally unique identifier is assigned to the second IoT device (e.g., the light 418).

At 608, the process 600 includes determining, using the second universally unique identifier, that the communication received from the first IoT device is an unauthorized message attempt by the first IoT device to exchange a message with the second IoT device. For example, the computing device of the messaging system 402 or the computing device of the messaging system 412 may determine that the communication received from the messaging system interface 408 is an unauthorized message attempt to exchange a message with the light 418. An unauthorized message attempt may be determined using one or more of the techniques described above.

In some embodiments, an unauthorized message attempt may be detected using a permissions record associated with the second universally unique identifier assigned to the second IoT device. For example, the process 600 may include accessing, using the computing device, a permissions record associated with the second universally unique identifier assigned to the second IoT device. The permission record includes a first list of universally unique identifiers associated with IoT devices that have permission to access the second IoT device at one or more levels of access or a second list of universally unique identifiers associated with IoT devices that do not have permission to access the second IoT device at the one or more levels of access. In some embodiments, the permissions record includes both the first list and the second list.

In some embodiments, the first list may include a single list and the second list may include a single list for all the levels of access for each respective IoT device. In some embodiments, the first list may include multiple lists and the second list may include multiple lists, such as separate lists for each of the one or more levels of access.

The process 600 may further include determining that the first IoT device is unauthorized to exchange the message with the second IoT device using the permissions record associated with the second universally unique identifier. The process 600 may further include determining that the communication received from the first IoT device is an unauthorized message attempt based on the determination that the first IoT device is unauthorized to exchange the message with the second IoT device.

In one example, the messaging systems 402 may maintain a permissions record in a device directory for the first IoT device (e.g., messaging system interface 408), which is registered with the messaging system 402. The messaging system 412 may maintain a permissions record in a device directory for the second IoT device (e.g., light 418), which is registered with the messaging system 412. As previously described, a permissions record may include one or more lists, such as a whitelist and/or a blacklist, that are associated with a universally unique identifier (UUID) assigned to a user or person, a device, or a system (or component of a system or device, as described above).

The first list may include one or more whitelists and the second list may include one or more blacklists for the second IoT device. The computing device of the messaging system 412 may access the permissions record associated with the second UUID assigned to the second IoT device, and may determine that the first IoT device's UUID is not listed as an authorized UUID in the first list, or that the first IoT device's UUID is listed as an unauthorized UUID in the second list. For example, the communication from the first IoT device may include an attempt to configure the second IoT device (e.g., an attempt to change a setting of the second IoT device), and the UUID of the first IoT device may not be included in the configure access level whitelist of the permissions record for the second IoT device's UUID.

As another example, the communication from the first IoT device may include a message for the second IoT device to receive, but the UUID of the first IoT device may be listed in the receive access level of the second list. One of ordinary skill in the art will appreciate that many other examples exist in which a permissions record may be analyzed to determine whether a message attempt is unauthorized. In either example, the computing device of the messaging system 412 can determine from the permissions record that the first IoT device is unauthorized to exchange the message in the communication with the second IoT device. As a result, the computing device may determine that the communication received from the first IoT device is an unauthorized message attempt.

In some embodiments, an unauthorized message attempt may be detected by querying an analytics system. For example, the process 600 may include transmitting, by the computing device, a query to an analytics system. The query may include a request for any unauthorized message attempts associated with the second universally unique identifier assigned to the second IoT device. The query may be transmitted using a transceiver or a transmitter of the computing device.

The process 600 may further include receiving a response from the analytics system indicating that the communication received from the first IoT device includes an unauthorized message attempt by the first IoT device. The response may be received using a transceiver or a receiver of the computing device. The process 600 may further include determining that the communication received from the first IoT device is an unauthorized message attempt based on the response from the analytics system. In one example, the computing device of the messaging system 402 or the computing device of the messaging system 412 may query an analytics system.

The analytics system may aggregate large amounts of data from the devices and systems registered with each messaging system 402, 412, and/or any other messaging system described herein. The information stored by the analytics systems may be used to detect certain events or anomalies that indicate an unauthorized message attempt. For example, a messaging system 402 may query an analytics system or database for any message attempts that exceed a throttle restriction. The analytics system may return results of any UUIDs that have attempted to send messages in a way that violates a throttle. For example, the communication from the messaging system interface 408 may exceed a certain threshold number of communications that are allowed to be sent to the light 418 during a given amount of time.

As another example, the analytics system may detect an abnormal message attempt from the first IoT device. For example, the first IoT device may typically send messages to the second IoT device at a specific time on a particular day, and the analytics system may detect that the communication is sent at a time different from the specific time or on a different day than the particular day. The computing device of the messaging system 402 or the computing device of the messaging system 412 may receive a response from the analytics system indicating that the communication from the messaging system interface 408 is unauthorized.

In some embodiments, an unauthorized message attempt may be detected based on predetermined number of communications from the first IoT device. For example, the process 600 may include detecting an occurrence of a predetermined number of communications from the first IoT device, and determining that the communication received from the first IoT device is an unauthorized message attempt based on the predetermined number of communications being detected from the first IoT device. In some examples, the predetermined number may be designated by a throttle of the second IoT device's security profile, as described above. For example, a throttle may limit the number of message attempts that can be made to the second IoT's unique identifier to under twenty every five minutes or other appropriate predetermined number.

In some embodiments, an unauthorized message attempt may be detected based on a security profile associated with the second universally unique identifier assigned to the second IoT device. For example, the process 600 may include accessing, using the computing device, a security profile associated with the second universally unique identifier assigned to the second IoT device. The security profile includes a permissions record and one or more restrictions.

The process 600 may further include determining that the communication received from the first IoT device violates the security profile, and determining that the communication received from the first IoT device is an unauthorized message attempt based on the determination that the communication received from the first IoT device violates the security profile. For example, the security profile associated with the second universally unique identifier may include the security profile 500 illustrated in FIG. 5.

The computing device may determine whether any of the access permissions of the permissions record or whether a restriction from the one or more restrictions are violated. In one example, the computing device of the messaging system 402 or the computing device of the messaging system 412 may check the whitelist or blacklist of the permissions record, or may check a timing restriction, a location restriction, a throttle, a message envelope restriction, a presence restriction, or a path restriction, as described above, to determine whether the communication from the first IoT device (e.g., the messaging system interface 408) is an unauthorized message attempt to exchange a message with the second IoT device (e.g., the light 418).

In some embodiments, the second universally unique identifier assigned to the second IoT device is associated with a plurality of security profiles, wherein a security profile includes a permissions record and one or more restrictions, and wherein different ones of the plurality of security profiles are assigned to one or more groups. For example, different security profiles associated with the second universally unique identifier may be applied to different groups of the one or more groups. The one or more groups may include a company, a service or carrier, a device or groups of devices, a person or group of people, or any other appropriate group.

In one example, a payload of the communication is encrypted. The process 600 may include checking an encryption certificate included in the communication, and determining whether the encryption certificate allows the first IoT device to exchange the communication with the second IoT device.

In another example, the process 600 may include obtaining, by the computing device, a message envelope of the communication and analyzing the message envelope to determine whether the communication is an approved type of communication. For example, the computing device may check a security profile associated with the second IoT device to determine whether the message envelope meets a message envelope restriction (e.g., message envelope restriction 516).

The process 600 may further include determining, based on the analyzed message envelope, that the communication is not an approved type of communication. For example, the message envelope restriction may indicate that only a certain type of information may be sent to the second IoT device. In some examples, a payload of the communication may be analyzed to determine if the communication includes an approved type of information.

The process 600 may further include determining that the communication received from the first IoT device is an unauthorized message attempt based on the determination that the communication received from the first IoT device is not an approved type of communication.

In some embodiments, the process 600 includes preventing the first IoT device from exchanging communications with any devices upon determining that the communication received from the first IoT device is an unauthorized message attempt. For example, preventing the first IoT device from exchanging communications with any devices may include rejecting any messages communicated to the first IoT device and rejecting any messages communicated from the first IoT device.

In some examples, the first IoT device may be prevented from exchanging communications with any other devices when a predetermined number of unauthorized message attempts are detected from a device. In some embodiments, the first universally unique identifier of the first IoT device may be removed or unregistered from a messaging system upon determining that the communication is an unauthorized message attempt or upon determining that a predetermined number of unauthorized message attempts has been reached by the first IoT device.

One of ordinary skill in the art will appreciate that any number of unauthorized message attempts may be designated as a limit on unauthorized message attempts. In some embodiments, the process 600 may include transmitting a notification to the second IoT device, wherein the notification indicates an occurrence of the unauthorized message attempt by the first IoT device. The notification may be transmitted using a transceiver or a transmitter of the computing device.

For example, a computing device of a messaging system 402, 412, or 420 may transmit a notification to the second IoT device when it is determined that the first IoT device has attempted to send the unauthorized message to the second IoT device. In some embodiments, the computing device may store a record of unauthorized message attempts. The record may be queriable. One of ordinary skill in the art will appreciate that various other functions may be performed in response to detection of one or more unauthorized message attempts by a device, user, or system.

Figure 7:
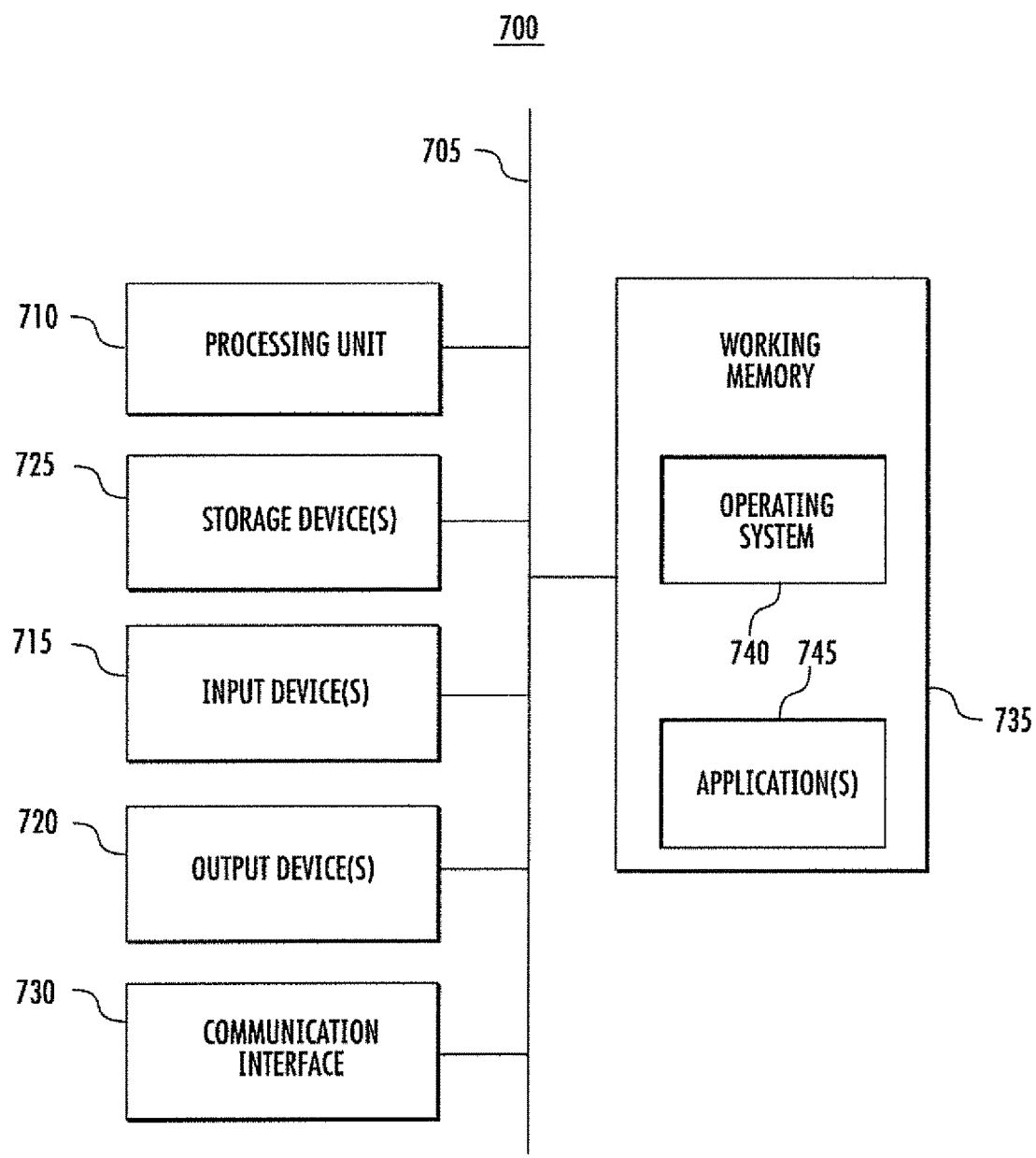
FIG. 7 is a block diagram of an example of a computing device or system, according to some embodiments.

A computer system as illustrated in FIG. 7 may be incorporated as part of the previously described computing devices and systems. For example, computer system 700 can represent one or more of the components of the messaging system 102, the platform network 108, the messaging system gateway 114, the messaging system interface 116, or the mobile gateway 118 of FIG. 1, the messaging system 302, messaging system 304, messaging system interfaces 308, 310, 312, 314, or messaging system gateway 306 of FIG. 3, the messaging system 402, the messaging system 412, the messaging system 420, the messaging system gateway 404, the messaging system gateway 414, or the messaging system gateway 422 of FIG. 4, or any of the IoT devices, third-party messaging accounts, and/or computing devices and systems described herein.

FIG. 7 provides a schematic illustration of one embodiment of a computer system 700 that can perform the methods provided by various other embodiments, as described herein, and/or can function as the host computer system, a remote kiosk/terminal, a point-of-sale device, a mobile device, and/or a computer system. FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include a processing unit 710, including without limitation one or more general-purpose processors and/or one or more special-purpose processors (such as digital signal processing chips, graphics acceleration processors, or other appropriate data processor); one or more input devices 715, which can include without limitation a mouse, a keyboard, a touchscreen, a global positioning system (GPS) receiver, a motion sensor, a camera, and/or the like; and one or more output devices 720, which can include without limitation a display device, a speaker, a printer, and/or the like.

The computer system 700 may further include (and/or be in communication with) one or more non-transitory computer-readable storage mediums or devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communication interface 730, which can include without limitation a modem, a network card (wireless or wired), an infrared communication device, a wireless communication device and/or chipset (such as a Bluetooth™ device, an 802.11 device, a WiFi device, a WiMax device, an NFC device, cellular communication facilities, etc.), and/or similar communication interfaces. The communication interface 730 may permit data to be exchanged with a network (such as the network described below, to name one example), other computer systems, and/or any other devices described herein.

In many embodiments, the computer system 700 will further comprise a non-transitory working memory 735, which can include a RAM or ROM device, as described above. The computer system 700 may further include one or more receivers and one or more transmitters. For example, the communication interface 730 may include one or more receivers and one or more transmitters. In another example, the computer system 700 may include one or more transceivers, one or more receivers, and/or one or more transmitters that are separate from the communication interface 730.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the one or more non-transitory computer-readable storage mediums or devices 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

In some examples, a receiver of the computer system 700 may receive a communication from a first Internet of Things (IoT) device, wherein the communication is destined for a second IoT device, wherein the first IoT device is assigned a first universally unique identifier, and wherein the communication includes a second universally unique identifier assigned to the second IoT device. In such examples, the one or more non-transitory computer-readable storage mediums or devices 725 may contain instructions which when executed on the one or more data processors, cause the one or more processors to perform operations including obtaining the second universally unique identifier, determining that the second universally unique identifier is assigned to the second IoT device, and determining, using the second universally unique identifier, that the communication received from the first IoT device is an unauthorized message attempt by the first IoT device to exchange a message with the second IoT device.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system.

For example, an journey planning and pricing engine configured to provide some or all of the features described herein relating to the journey planning and/or pricing can comprise hardware and/or software that is specialized (e.g., an application-specific integrated circuit (ASIC), a software method, etc.) or generic (e.g., processing unit 710, applications 745, etc.) Further, connection to other computing devices such as network input/output devices may be employed.

Some embodiments may employ a computer system (such as the computer system 700) to perform methods in accordance with the disclosure. For example, some or all of the procedures of the described methods may be performed by the computer system 700 in response to processing unit 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processing unit 710 to perform one or more procedures of the methods described herein.

In an embodiment implemented using the computer system 700, various computer-readable storage media might be involved in providing instructions/code to processing unit 710 for execution and/or might be used to store and/or carry such instructions/code (e.g., as signals). In many implementations, a computer-readable storage medium is a physical and/or tangible storage medium. Such a medium may take many forms, including but not limited to, non-volatile media, volatile media, and transmission media.

Non-volatile media include, for example, optical and/or magnetic disks, such as the storage device(s) 725. Volatile media include, without limitation, dynamic memory, such as the working memory 735. Transmission media include, without limitation, coaxial cables, copper wire and fiber optics, including the wires that comprise the bus 705, as well as the various components of the communication interface 730 (and/or the media by which the communication interface 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a non-transitory storage device 725 either before or after execution by the processing unit 710.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing description, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

Figure 8:
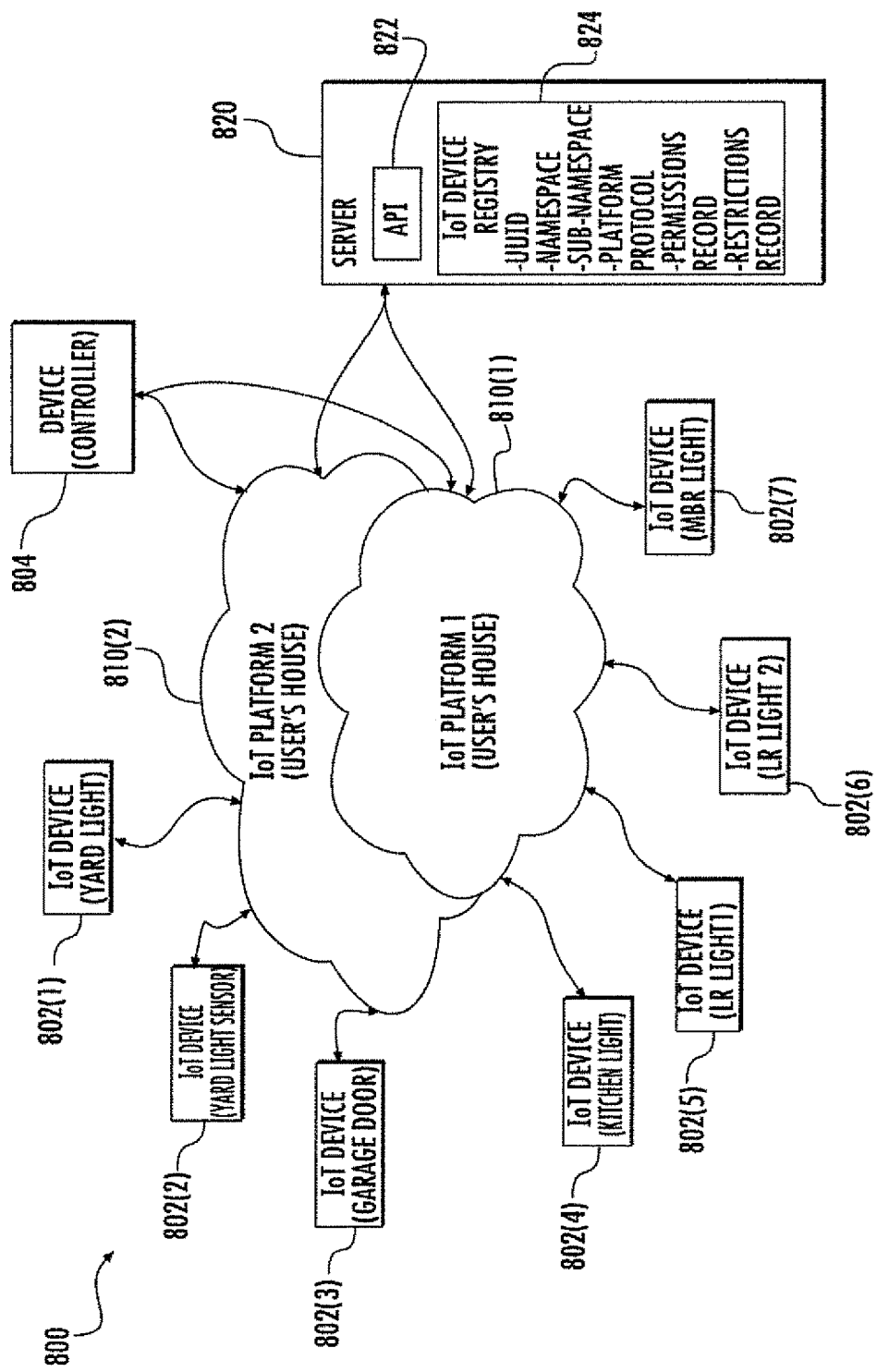
FIG. 8 is a block diagram illustrating an example of a system for controlling IoT devices using namespaces, according to some embodiments.

Referring now to FIG. 8, another aspect of the invention is directed to providing IDs for IoT devices 802. The IoT devices are generally indicated by reference 802 while specific IoT devices in the illustrated embodiment are addressed by references 802(1)-802(7).

The IDs may be easy to remember names in the form of namespaces and sub-namespaces that are mapped to the IoT devices 802. The namespace is a top level ID for all of the IoT devices 802 belonging to a particular user or entity. The sub-namespaces are linked to the namespace and are used to identify the IoT devices 802 based on their location and/or function. A namespace and the sub-namespaces translate to the UUIDs and routing paths stored in an IoT device registry 824 needed to communicate via an IoT platform 810.

The system 800 illustrated in FIG. 8 includes a server 820 configured to assign a namespace to the IoT devices 802, with the IoT devices being at different locations, and with each IoT device having a UUID associated therewith. The server 820 is also configured to assign at least one sub-namespace to each IoT device 802 based on its location and/or function, and map the UUID associated with each IoT device to both the namespace and the at least one sub-namespace assigned thereto. A device 804 cooperates with the server 820 to generate commands for controlling the IoT devices 802 based on the namespaces and the at least one sub-namespaces mapped to the respective UUIDs.

For illustration purposes, the IoT devices 802 are at different locations at a user's house. IoT device 802(1) is associated with an outside light, IoT device 802(2) is associated with a sensor for the outside light, IoT device 802(3) is associated with a garage door opener, IoT device 802(4) is associated with a kitchen light, IoT device 802(5) is associated with living room light 1, IoT device 802(6) is associated with living room light 2, and IoT device 802(7) is associated with a light in the master bedroom.

Even though seven IoT devices 802(1)-802(7) are illustrated, there is no limit on the number of IoT devices that may be operating within the system 800. In addition, the functions of the IoT devices 802(1)-802(7) are examples only and are not to be limiting. Other types of IoT devices may be used within the system 800, as readily appreciated by those skilled in the art.

The server 820 includes an interactive API 822 to allow the user to access and communicate with the IoT platform 810 and to register the IoT devices 802. The server 820 may be cloud based, for example, and as part of the registration each IoT device 802 is assigned a UUID, as readily appreciated by those skilled in the art. The device 804 for controlling the IoT devices 802 at the user's house is also assigned a UUID. Each UUID is 36 characters. The namespace, sub-namespaces and UUIDs for each respective IoT device 802 that are part of the IoT platform 810 along with a path of message routing for each IoT device are stored in the device registry 824. In addition, the device 804 for controlling the IoT devices 802 also has a namespace, sub-namespaces and a UUID assigned thereto that are stored in the device registry 824.

The device 804 may be a fixed device within the user's house, such as an Arduino Uno microcontroller, for example. Alternatively, the device 804 may be a mobile device with a mobile gateway, such as a mobile phone, tablet, laptop, wearable device, or other suitable mobile device.

The interactive API 822 allows the user to assign a namespace to all of the user's IOT devices 802(1)-802(7) and to device 804. For example, the namespace is the user's name, Chris. The interactive API 822 then allows the user to assign sub-namespaces to each IoT device 802 based on its location and/or function within the house. The following is a list of the namespace and sub-namespaces assigned to the IoT devices 802(1)-802(7) and to device 804:
Chris.home.yard.light=IoT device 802(1)
Chris.home.sensoryardlight=IoT device 802(2)
Chris.home.garagedoor=IoT device 802(3)
Chris.home.kitchen.light=IoT device 802(4)
Chris.home.livingroom.light1=IoT device 802(5)
Chris.home.livingroom.light2=IoT device 802(6)
Chris.home.masterbedroom.light=IoT device 802(7)
Chris.devicecontrol=device 804

Registration of a namespace is based on a first come, first serve basis. There can only be one unique namespace, which is similar to registering a dot.com domain name. The namespace Chris belongs to this particular user and is in a leftmost position, and for each respective IoT device, is followed by the sub-namespaces. For example, home and yard light are sub-namespaces linked to Chris for IoT device 802(1).

There is no limit to the number of sub-namespaces that can be linked to the namespace to implicitly group IoT devices, locations and organizations together. In the illustrated example, each of the sub-namespaces advantageously allows the user Chris to recognizably identify the IoT devices 802(1)-802(7) by location within his house. In addition, including the function of the IoT devices 802(1)-802(7) within the sub-namespaces further helps the user Chris to recognizably identify the IoT devices 802(1)-802(7).

The server 820 maps the respective UUIDs associated with each IoT device 802 and with the device 804 via the interactive API 822 to both the namespace and the sub-namespaces assigned thereto. The mapping also associates an IoT protocol of the IoT platform 810 to each IoT device 802. The system 800 is not limited to any particular IoT platform 810. Example IoT platforms 810 are Meshblu by Citrix Octoblu, Bluemix by IBM, M2X by AT&T, Artik by Samsung, AWS by Amazon, and Azure by Microsoft. Any IoT device 802 operating based on anyone of these IoT platforms 810, including future IoT platforms to be developed, may be included in the illustrated system 800.

In addition, the system 800 is not limited to only one IoT platform operating at a time, which is generally indicated by reference 810. In the illustrated example, multiple IoT platforms identified by references 810(1) and 810(2) are operating. Even though two IoT platforms are illustrated, there is no limit on the number of IoT platforms that may be operating within the system 800.

Still referring to FIG. 8, a first portion of the IoT devices is associated with a first IoT platform 810(1) operating based on a first IoT protocol, and a second portion of the IoT devices is associated with a second IoT platform 810(2) operating based on a second IoT protocol that is different from the first IoT protocol.

IoT devices 802(1)-802(3) operate with the first IoT platform 810(1), and IoT devices 802(4)-802(7) operate with the second IoT platform 810(2). The device 804 is configured to send commands to both of the first and second IoT platforms 810(1), 810(2), which may operate at the same time. The namespace and sub-namespaces assigned to the IoT devices 802(1)-802(7) advantageously allow the different multi-vendor IoT platforms 810(1), 810(2) to be bridged together.

Figure 9:
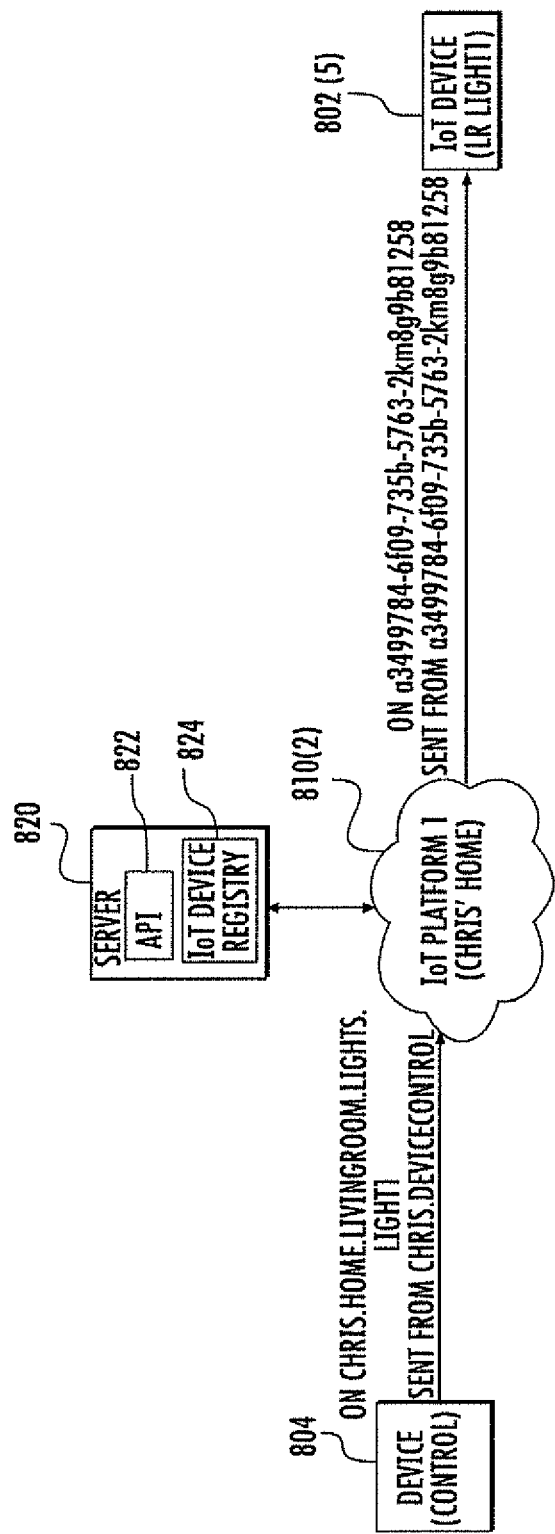
FIG. 9 is a block diagram of a portion of the system illustrated in FIG. 8 illustrating a command being sent to control an IoT device.

To more clearly illustrate a command being sent from the device 804 to a particular IoT device 802(5), reference is directed to FIG. 9. The 36 character UUID associated with the device 804 may be a3499784-6f09-735b-5763-2km8g9681258, for example, and the 36 character UUID associated with IoT device 802(5) may be a3499784-6f09-735b-5763-2km8g9681258, for example.

The user operates the device 804 to generate a command to "turn on living room light 1" which corresponds to IoT device 802(5). Generation of the command by the device 804 is not limited to any particular format or method. For example, the device 804 may respond to a prompt selected on a display of the device, a voice input received by a microphone carried by the device, and even social media inputs such as a tweet or a facebook post. In other embodiments, the command may be automated, like every night at 8:00 pm "turn on the living room light 1" 802(5). If the device 804 is mobile, then the command may be given based on proximity of the device to the living room, such as when entering the living room.

The IoT platform 810(2) receives the command from the device 804 without receiving the UUIDs associated with IoT device 802(5) or with the device sending the command, which are difficult to remember. Instead, the IoT platform 810(2), via the device registry 824, determines the applicable UUIDs and message routing and sends the "turn on living room light 1" command to the IoT device 802(5). The command from the IoT platform 810(2) may be as follows: "on  a3499784-6f09-735b-5763-2km8g9681258  from a3499784-6f09-735b-5763-2km8g9681258."

Figure 10:
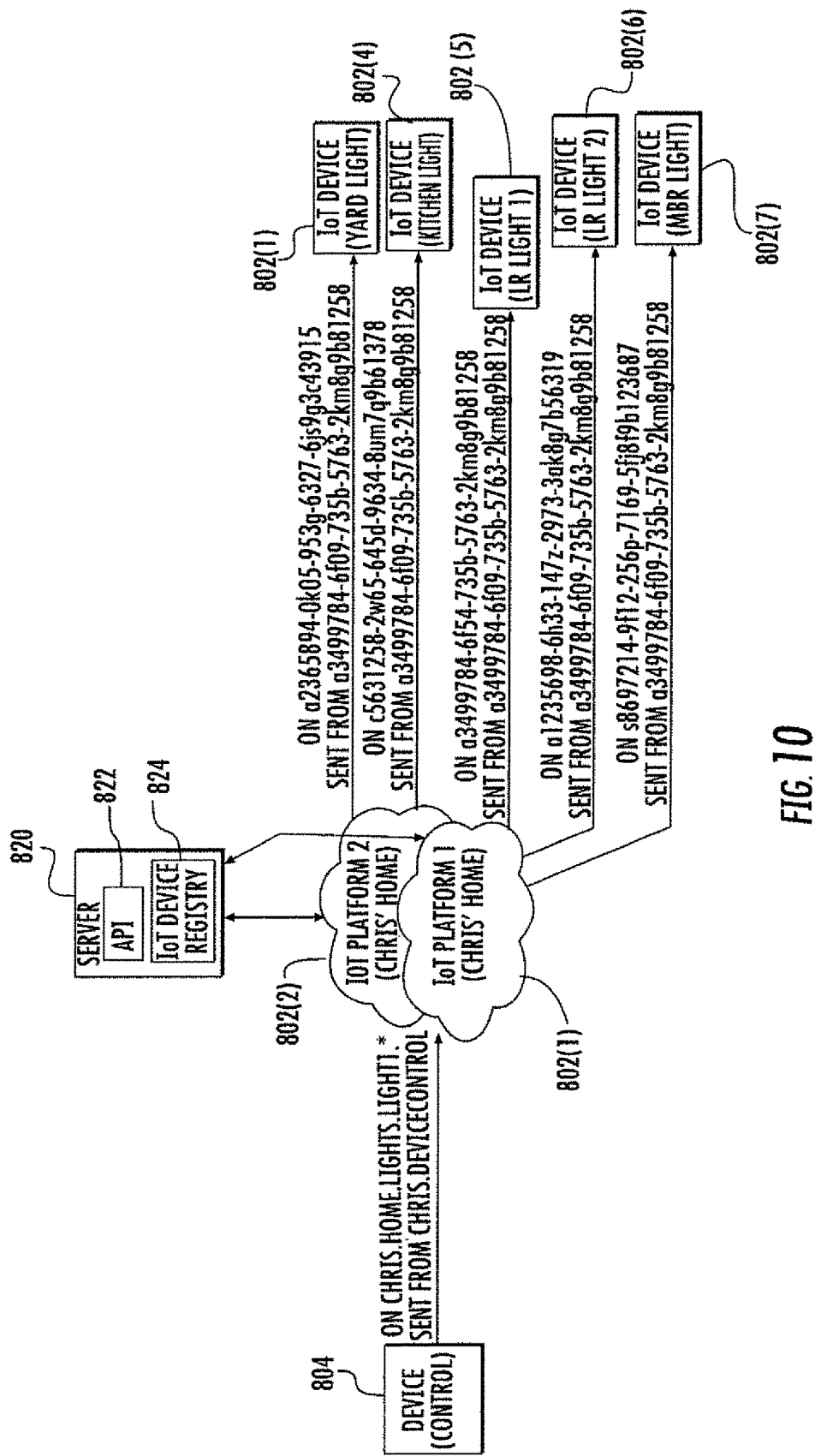
FIG. 10 is another block diagram of a portion of the system illustrated in FIG. 8 illustrating a wildcard command being sent to control multiple IoT devices.

In another embodiment, a wildcard command may be generated by the device 804 so as to control multiple IoT devices that are grouped together based on a same function. Referring now to FIG. 10, the IoT devices that turn on/off a light are grouped together. IoT devices 802(1), 802(4), 802(5), 802(6) and 802(7) may be grouped together since they all are associated with turning on/off lights.

The interactive API 822 allows the user to include one or more wildcard characters in a command to simultaneously control grouped together IoT devices. The wildcard characters may be any alphanumeric character. In the illustrated example, the wildcard character is an "*".

If the user wants to turn on all the lights in his house, such as when arriving home in the evening, then the user operates the device 804 to generate the command "turn lights on." The command to "turn lights on" corresponds to the namespace and sub-namespaces Chris.home.lights.*. By the user generating this wildcard command, the IoT platforms 810(1) and 810(2), via the device registry 824, determines the applicable UUIDs and message routing and sends the respective commands to each of the grouped together IoT devices: 802(1), 802(4), 802(5), 802(6) and 802(7), as illustrated in FIG. 10. The interactive API 822 may ask the user for confirmation that all of the house lights are to be turned on.

Figure 11:
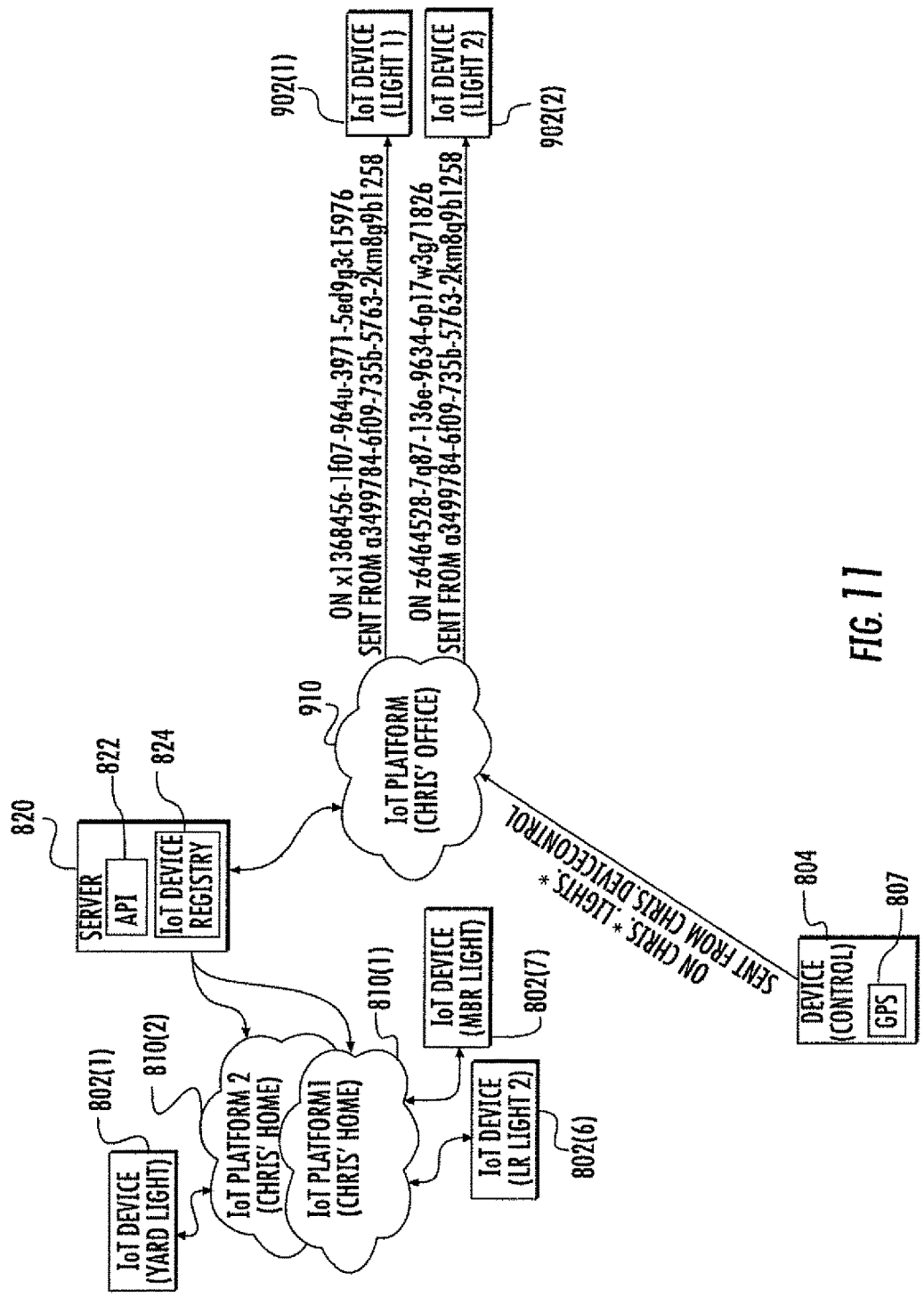
FIG. 11 is block diagram of the system illustrated in FIG. 8 with an additional IoT platform illustrating a shared command being sent to control IoT devices at one of the IoT platforms based on location of the device sending the command.

Referring now to FIG. 11, the commands generated by the device 804 may be a shared command to control multiple IoT devices performing a same function at different locations. For example, the user has IoT devices 802 at his house that are controlled via IoT platforms 810(1), 810(2) and IoT devices 902 at his office to control via IoT platforms 910. The shared command to "turn on lights" may be used to turn on the lights at the user's house and to turn on the lights in the user's office.

To simplify matters, the server 820 receiving the shared command makes a determination based on location of the device 804, or where the shared command was initiated by the device 804, if the user is referring to the lights at his house or to the lights in his office. Mobile gateways associated with the IoT platforms 810(1), 810(2) and 910 may access all sensors on the mobile device 804. For example, geolocation sensor data via a GPS sensor 807, compass headings, accelerometer data, or any other sensor data of the mobile device 804 may be provided to the server 820 through the mobile gateway. In addition, location of the mobile device 804 may be provided based on proximity to other IoT devices which may then communicate with the server 820. When using proximity of the mobile device 804 based on its location to other IoT devices 802, geolocation data does not need to be provided by the mobile device itself.

In the illustrated example, the user Chris is heading toward his office based on the sensor data provided by his mobile device 804. The IoT devices 902 at the user's office are assigned to the same namespace Chris, and have the following sub-namespaces:
Chris.office.lights.light1=IoT device 902(1)
Chris.office.lights.light2=IoT device 902(2)

The interactive API 822 allows the user to include one or more wildcard characters in the shared command. In the example, the shared command is Chris.*.lights.*. The first wildcard character "*" covers both the user's home and the user's office. The second wildcard character "*" is referring to all of the lights at the user's home and at the user's office.

The IoT platform 910 receives the shared command from the mobile device 804 without receiving the UUIDs associated with any of the IoT devices or with the device sending the shared command. Instead, the IoT platform 910, via the device registry 824, uses the sensor data from the mobile device 804 to determine where the mobile device is heading or is located. In the example, the IoT platform 910 at the user's office determines the applicable UUIDs and message routing and sends the "turn on lights" command to the IoT device 902(1) and 902(2).

As discussed above, in some embodiments, one or more security profiles may be associated with a UUID assigned to an. IoT device. The server 820 is further configured to generate at least one restrictions record associated with the IoT devices 802, with the at least one restrictions record allowing the server to control access to the IoT devices based on at least one of timing restrictions, location restrictions, presence restrictions and path restrictions.

In addition, the server 820 is further configured to generate at least one permissions record associated with the IoT devices 802, with the at least one permissions record allowing the server to detect unauthorized commands for controlling the IoT devices. The permissions record may includes a whitelist identifying which IoT devices can communicate with other IoT devices, and a blacklist identifying which IoT devices cannot communicate with other IoT devices.

Figure 12:
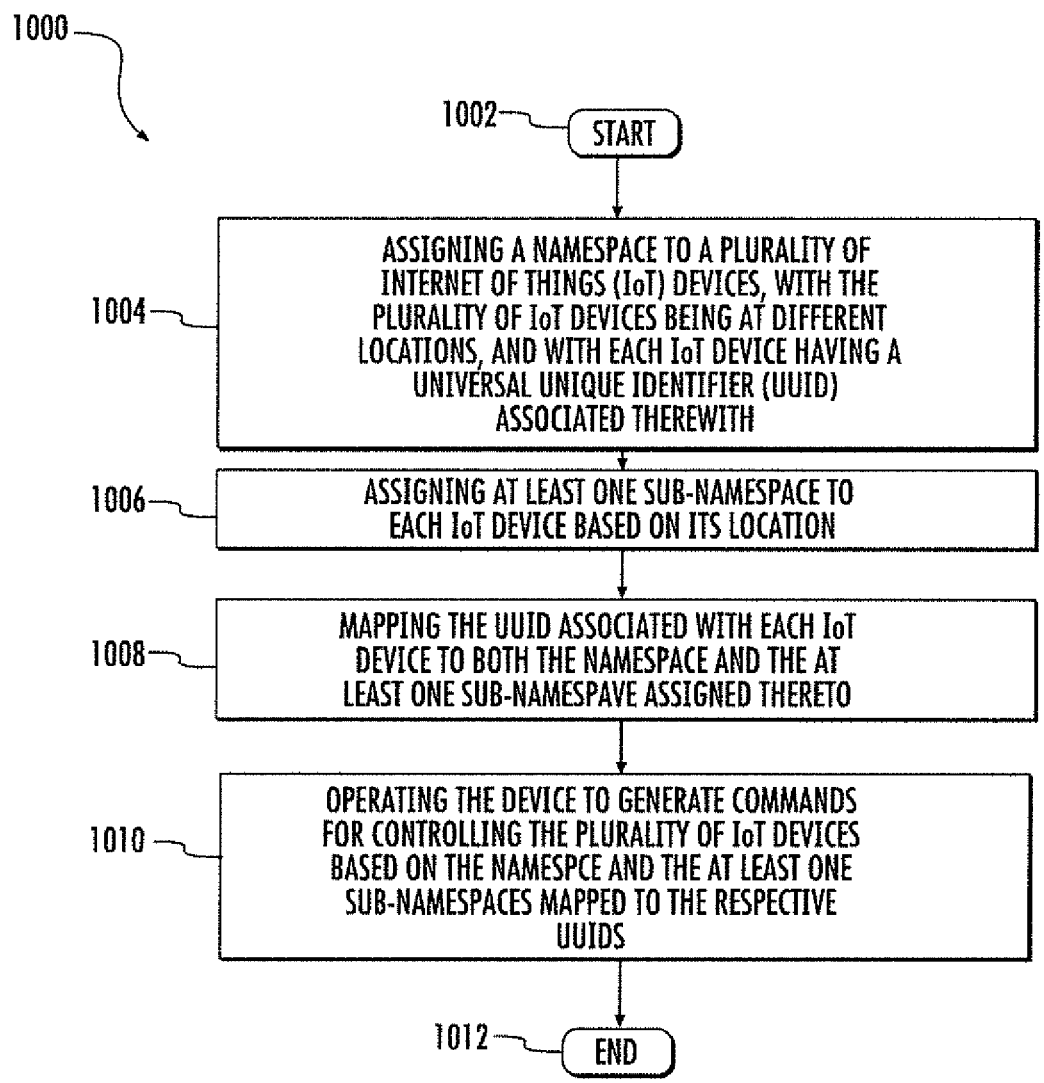
FIG. 12 is a flowchart illustrating a method for operating the system illustrated in FIG. 8.

Another aspect is directed to a method for operating a system 800 based on the above discussed namespaces and sub-namespaces to control IoT devices 802. Referring to the flowchart 1000 in FIG. 12, the method comprises from the start (Block 1002), operating the server 820 to assign a namespace to IoT devices 802 at Block 1004. The IoT devices 802 are at different locations, and each IoT device has a UUID associated therewith. At least one sub-namespace is assigned to each IoT device 802 based on its location at Block 1006. The UUID associated with each IoT device 802 is mapped to both the namespace and the at least one sub-namespace assigned thereto at Block 1008. The method further includes operating the device 804 to generate commands for controlling the IoT devices 802 based on the namespaces and the at least one sub-namespaces mapped to the respective UUIDs at Block 1010. The method ends at Block 1012.

Yet another aspect is directed to a non-transitory computer readable medium having a plurality of computer executable instructions for causing a system 800 to perform steps that include assigning a namespace to a IoT devices 802, with the IoT devices being at different locations, and with each IoT device having a UUID associated therewith. The steps further include assigning at least one sub-namespace to each IoT device 802 based on its location, and mapping the UUID associated with each IoT device to both the namespace and the at least one sub-namespace assigned thereto. The IoT devices are then controlled based on the step of receiving commands that have the namespaces and the at least one sub-namespaces mapped to the respective UUIDs.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the foregoing description.

That which is claimed:
1. A system comprising:
a server configured to
assign a namespace to a plurality of Internet of Things (IoT) devices, with the plurality of IoT devices being at different locations, and with each IoT device having a universal unique identifier (UUID) associated therewith,
assign at least one sub-namespace to each IoT device based on its location, with the at least one sub-namespace being unique for each IoT device, map the UUID associated with each IoT device to both the namespace and the at least one sub-namespace assigned thereto, and generate at least one permissions record associated with said plurality of IoT devices to be used in controlling access to said plurality of IoT devices, the at least one permissions record identifying which IoT devices can communicate with other IoT devices and which IoT devices cannot communicate with other IoT devices;

associate a first portion of said plurality of IoT devices to a first IoT platform operating based on a first IoT protocol, and a second portion of said plurality of IoT devices to a second IoT platform operating based on a second IoT protocol different from the first IoT protocol, and wherein the at least one permissions record includes a first permissions record associated with said first IoT platform and a second permissions record associated with said second IoT platform; and a device cooperating with said server to generate commands for controlling said plurality of IoT devices based on the namespaces and the at least one sub-namespaces mapped to the respective UUIDs, and based on the at least one permissions record.

2. The system according to claim 1 wherein the commands generated by said device do not include the plurality of UUIDs associated with said plurality of IoT devices.

3. The system according to claim 1 wherein a portion of said plurality of IoT devices is grouped together based on performing a same function, and wherein the commands include a wildcard command to simultaneously control each IoT device within the grouped together IoT devices.

4. The system according to claim 1 wherein the commands include a shared command to control multiple IoT devices performing a same function at the different locations, wherein said device comprises a mobile device configured to provide its location to said server when generating the shared command, and wherein said server selects one of the multiple IoT devices to control based on location of said mobile device.

5. The system according to claim 1 wherein the first and second IoT platforms operate at a same time.

6. The system according to claim 1 wherein said server is further configured to generate at least one restrictions record associated with said plurality of IoT devices, with the at least one restrictions record allowing said server to control access to said plurality of IoT devices based on at least one of timing restrictions, location restrictions, presence restrictions and path restrictions.

7. The system according to claim 1 wherein the at least one permissions record allows said server to detect unauthorized commands for controlling said plurality of IoT devices.

8. The system according to claim 7 wherein identifying which IoT devices can communicate with other IoT devices corresponds to a whitelist, and identifying which IoT devices cannot communicate with other IoT devices corresponds to a blacklist.

9. The system according to claim 1 wherein the namespace is in a leftmost position, and for each respective IoT device, is followed by the at least one sub-namespace assigned to that respective IoT device.

10. The system according to claim 1 wherein said server is configured as a cloud-based server.

11. The system according to claim 1 wherein said device controls said plurality of IoT devices via a wireless network.

12. A method for operating a system comprising a server and a device cooperating with the server, the method comprising:

operating the server to assign a namespace to a plurality of Internet of Things (IoT) devices, with the plurality of IoT devices being at different locations, and with each IoT device having a universal unique identifier (UUID) associated therewith, assign at least one sub-namespace to each IoT device based on its location, with the at least one sub-namespace being unique for each IoT device, map the UUID associated with each IoT device to both the namespace and the at least one sub-namespace assigned thereto, and generate at least one permissions record associated with the plurality of IoT devices to be used in controlling access to the plurality of IoT devices, the at least one permissions record identifying which IoT devices can communicate with other IoT devices and which IoT devices cannot communicate with other IoT devices;

associate a first portion of the plurality of IoT devices to a first IoT platform operating based on a first IoT protocol, and a second portion of the plurality of IoT devices to a second IoT platform operating based on a second IoT protocol different from the first IoT protocol, and wherein the at least one permissions record includes a first permissions record associated with the first IoT platform and a second permissions record associated with the second IoT platform; and operating the device to generate commands for controlling the plurality of IoT devices based on the namespaces and the at least one sub-namespaces mapped to the respective UUIDs, and based on the at least one record.

13. The method according to claim 12 wherein the commands generated by the device do not include the plurality of UUIDs associated with the plurality of IoT devices.

14. The method according to claim 12 wherein a portion of the plurality of IoT devices is grouped together based on performing a same function, and wherein the commands include a wildcard command to simultaneously control each IoT device within the grouped together IoT devices.

15. The method according to claim 12 wherein the commands include a shared command to control multiple IoT devices performing a same function at the different locations, wherein the device comprises a mobile device configured to provide its location to the server when generating the shared command, and wherein operating the server further comprises selecting one of the multiple IoT devices to control based on location of the mobile device.

16. The method according to claim 12 wherein the server is further operated to generate at least one restrictions record associated with the plurality of IoT devices, with the at least one restrictions record allowing the server to control access to the plurality of IoT devices based on at least one of timing restrictions, location restrictions, presence restrictions and path restrictions.

17. The method according to claim 12 wherein the at least one permissions record allows the server to detect unauthorized commands for controlling said plurality of IoT devices.

18. A non-transitory computer readable medium having a plurality of computer executable instructions for causing a system to perform steps comprising:

assigning a namespace to a plurality of Internet of Things (IoT) devices, with the plurality of IoT devices being at different locations, and with each IoT device having a universal unique identifier (UUID) associated therewith;

assigning at least one sub-namespace to each IoT device based on its location, with the at least one sub-namespace being unique for each IoT device;

mapping the UUID associated with each IoT device to both the namespace and the at least one sub-namespace assigned thereto;

generating at least one permissions record associated with the plurality of IoT devices to be used in controlling access to the plurality of IoT devices, the at least one permissions record identifying which IoT devices can communicate with other IoT devices and which IoT devices cannot communicate with other IoT devices;

associating a first portion of the plurality of IoT devices to a first IoT platform operating based on a first IoT protocol, and a second portion of the plurality of IoT devices to a second IoT platform operating based on a second IoT protocol different from the first IoT protocol, and wherein the at least one permissions record includes a first permissions record associated with the first IoT platform and a second permissions record associated with the second IoT platform; and controlling the plurality of IoT devices based on the namespaces and the at least one sub-namespaces mapped to the respective UUIDs in response to receiving commands, and based on the at least one permissions record.

19. The non-transitory computer readable medium according to claim 18 wherein the received commands do not include the plurality of UUIDs associated with the plurality of IoT devices.

20. The non-transitory computer readable medium according to claim 18 wherein a portion of the plurality of IoT devices is grouped together based on performing a same function, and wherein the commands include a wildcard command to simultaneously control each IoT device within the grouped together IoT devices.

21. The non-transitory computer readable Medium according to claim 18 wherein the received commands include a shared command to control multiple IoT devices performing a same function at the different locations, with the received commands being generated by a mobile device configured to provide its location when generating the shared command, and further comprising the step of selecting one of the multiple IoT devices to control based on location of the mobile device.

22. The non-transitory computer readable medium according to claim 18 further comprises the step of associating the plurality of IoT devices to at least one IoT platform operating based on at least one IoT protocol.

23. The non-transitory computer readable medium according to claim 18 further comprises the step of generating at least one restrictions record controlling access to the plurality of IoT devices based on at least one of timing restrictions, location restrictions, presence restrictions and path restrictions.

24. The non-transitory computer readable medium according to claim 18 wherein the at least one permissions record allows unauthorized commands for controlling the plurality of IoT devices to be detected.

* * * * *